United States Patent
Wang et al.

(10) Patent No.: US 12,034,380 B2
(45) Date of Patent: Jul. 9, 2024

(54) INVERTER CIRCUIT BASED ON A HERIC TOPOLOGY, INVERTER, AND PHOTOVOLTAIC POWER SYSTEM

(71) Applicant: Huawei Digital Power Technologies Co., Ltd., Shenzhen (CN)

(72) Inventors: Dechen Wang, Xi'an (CN); Peng Shi, Xi'an (CN); Zheng Ma, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 276 days.

(21) Appl. No.: 17/536,624

(22) Filed: Nov. 29, 2021

(65) Prior Publication Data

US 2022/0085756 A1 Mar. 17, 2022

Related U.S. Application Data

(63) Continuation of application No. PCT/CN2020/091982, filed on May 25, 2020.

(30) Foreign Application Priority Data

May 31, 2019 (CN) .......................... 201910469584.X

(51) Int. Cl.
*H02M 7/5387* (2007.01)
(52) U.S. Cl.
CPC ................................. *H02M 7/5387* (2013.01)
(58) Field of Classification Search
CPC .................................................. H02M 7/5387
See application file for complete search history.

(56) References Cited

U.S. PATENT DOCUMENTS

| 2015/0236617 A1 | 8/2015 | Pahlevaninezhad et al. |
| 2015/0318794 A1 | 11/2015 | Hansson |

FOREIGN PATENT DOCUMENTS

| CN | 102340258 A | 2/2012 |
| CN | 102185511 B | 4/2013 |
| CN | 103051233 B | 2/2015 |
| CN | 104377982 B | 2/2017 |

(Continued)

OTHER PUBLICATIONS

Weimin Wu et al., "A New LCL-Filter With In-Series Parallel Resonant Circuit for Single-Phase Grid-Tied Inverter", IEEE Transactions on Industrial Electronics, vol. 61, No. 9, Sep. 2014; pp. 4640-4644; 5 total pages.

(Continued)

*Primary Examiner* — Sisay G Tiku
(74) *Attorney, Agent, or Firm* — Rimon PC

(57) ABSTRACT

This application discloses an inverter circuit for an inverter such as a photovoltaic inverter. Also disclosed are inverters and photovoltaic power systems including such inverter circuits. The inverter circuit is based on a HERIC topology, and in the inverter circuit a third capacitor and a fourth capacitor are bridge-connected between a bus and a first longitudinal bridge and between the bus and a second longitudinal bridge respectively. In this way, when the inverter circuit goes from a starting phase to a freewheeling phase, the third capacitor and the fourth capacitor can stabilize a voltage fluctuation caused by different turn-off speeds of the switching transistors in the HERIC topology, to prevent resonance caused by the voltage fluctuations.

19 Claims, 16 Drawing Sheets

(56) References Cited

FOREIGN PATENT DOCUMENTS

| | | | | |
|---|---|---|---|---|
| CN | 106849722 A | | 6/2017 | |
| CN | 107294417 A | | 10/2017 | |
| CN | 107834887 A | * | 3/2018 | ........... B65H 75/245 |
| CN | 108832804 A | | 11/2018 | |
| CN | 109038677 A | * | 12/2018 | |
| CN | 110247571 A | | 9/2019 | |
| CN | 112117778 A | * | 12/2020 | |
| CN | 112865171 A | * | 5/2021 | |
| CN | 114499261 A | * | 5/2022 | |
| EP | 2717405 A1 | | 4/2014 | |
| EP | 3958455 A1 | * | 2/2022 | ........... H02M 1/126 |
| IN | 109149647 A | | 1/2019 | |
| WO | 2018046565 A1 | | 3/2018 | |
| WO | 2019012923 A1 | | 1/2019 | |
| WO | WO-2020238824 A1 | * | 12/2020 | ........... H02M 1/126 |

OTHER PUBLICATIONS

Zhang Hongrang, "Electrician Basics (vol. 2)", people"s education Press, May 1, 1979, with an English abstract, total 4 pages.

Anand Sandeep et al., "Transformer-Less Grid Feeding Current Source Inverter for Solar Photovoltaic System," IEEE Transactions on Industrial Electronics, vol. 61 No. 10, Oct. 2014, XP011546922, pp. 5334-5344; 11 total pages.

Teodorescu Remus et al., "Grid Filter Design," Grid Converters for Photovoltaic and Wind Power Systems, Dec. 19, 2010, XP093098695, pp. 290-312; 24 total pages.

Mei Ye et al: "Highly efficient and reliable inverter concept-based transformerless photovoltaic inverters with tri-direction clamping cell for leakage current elimination",IET Power Electronics, IET, UK,vol. 9, No. 8, Jun. 29, 2016,XP006057107,total 9 pages.

Erickson: "Fundamentals of Power Electronics Second Edition", Jan. 1, 2007 (Jan.1, 2007), XP055462444, total 881 pages.

Wu Tsai-Fu et al: "Soft-Switching Bidirectional Isolated Full-Bridge Converter With Active and Passive Snubbers", IEEE Transactions on Industrial Electronics, IEEE Service Center, vol. 61, No. 3, Mar. 1, 2014, XP011524918, total 9 pages.

Zhou Wenzhi et al: "Elimination of Overshoot and Oscillation in the Auxiliary Branch of a SiC Auxiliary Resonant Commutated Pole Inverter (ARCPI)", 2019 10th International Conference on Power Electronics and ECCE Asia (ICPE 2019—ECCE Asia), the Korean Institute of Power Electronics (KIPE),May 27, 2019, XP033596882, total 7 pages.

* cited by examiner

INVERTER CIRCUIT BASED ON A HERIC TOPOLOGY, INVERTER, AND PHOTOVOLTAIC POWER SYSTEM

CROSS-REFERENCE TO RELATED APPLICATIONS

This application is a continuation of International Application No. PCT/CN2020/091982, filed on May 25, 2020, which claims priority to Chinese Patent Application No. 201910469584.X, filed on May 31, 2019. The disclosures of the aforementioned applications are hereby incorporated by reference in their entireties.

TECHNICAL FIELD

This application relates to the field of voltage conversion technologies, and in particular, to an inverter circuit, an inverter, and a photovoltaic power system.

BACKGROUND

As a type of renewable clean energy, the photovoltaic power industry has been developing rapidly in recent years. A photovoltaic power system includes a plurality of components, such as a photovoltaic module, an inverter, a transformer, and a cable. The inverter is a core component for energy conversion of the photovoltaic power system, and converts a direct current output by the photovoltaic module into an alternating current available for a grid. In addition, inverters are also widely used in other systems that need to convert a direct current into an alternating current.

HERIC topologies generated based on a highly efficient and reliable inverter concept (HERIC) are widely used in photovoltaic inverter products thanks to their low cost. As shown in FIG. 1, in the conventional technology, a HERIC topology includes a first longitudinal bridge and a second longitudinal bridge. Two ends of the first longitudinal bridge are respectively connected to a first switching transistor and a second switching transistor. Two ends of the second longitudinal bridge are respectively connected to a third switching transistor and a fourth switching transistor. In an upper half cycle of inverter output, the first switching transistor and the fourth switching transistor are turned on. In a freewheeling phase, the first switching transistor and the fourth switching transistor are simultaneously turned off. In practice, turn-off speeds of the first switching transistor and the fourth switching transistor cannot maintain complete consistency. For example, a turn-off speed of the fourth switching transistor is faster than that of the first switching transistor. In this case, a voltage on a bus, the first longitudinal bridge, and the second longitudinal bridge increases. After the first switching transistor is turned off, the voltage falls back. A resonance phenomenon occurs in this process. Consequently, this impacts the electromagnetic compatibility (EMC) for a device and a system, which need to work normally in their electromagnetic environment without causing unacceptable electromagnetic interference to anything in the environment. As a result, conduction and radiation test results of the EMC exceed thresholds.

Therefore, the HERIC topology in the conventional technology still needs to be improved.

SUMMARY

Embodiments of this application provide an inverter circuit, an inverter, and a photovoltaic power system. A solution in which a capacitor is bridge-connected to a bus at a location of a connection point between a longitudinal bridge and a transverse bridge in a HERIC topology can suppress resonance caused by different turn-off speeds of switching transistors when a power circuit works normally.

A first aspect of this application provides an inverter circuit, including a bus, a first longitudinal bridge, a second longitudinal bridge, a transverse bridge, and a filter. A capacitor group is disposed on the bus, the bus is connected in parallel to a direct current power supply, and the capacitor group includes a first capacitor and a second capacitor that are disposed in series. The first capacitor is disposed on a side of the bus and is connected to a positive electrode of the direct current power supply, the second capacitor is disposed on a side of the bus and is connected to a negative electrode of the direct current power supply, and the first capacitor and the second capacitor are configured to be charged by the direct current power supply, to provide a direct current voltage to the first longitudinal bridge, the second longitudinal bridge, and the transverse bridge. The bus is connected in parallel to the first longitudinal bridge, the first longitudinal bridge is connected in parallel to the second longitudinal bridge, the first longitudinal bridge includes a first switching transistor and a second switching transistor that are connected in series, the second longitudinal bridge includes a third switching transistor and a fourth switching transistor that are connected in series, and two ends of the transverse bridge are respectively connected to the first longitudinal bridge and the second longitudinal bridge. The filter is connected in parallel to the transverse bridge, the filter is connected to an alternating current power grid, and the transverse bridge is configured to supply power to the alternating current power grid by using the filter. The inverter circuit further includes: a third capacitor, where the third capacitor is connected between the bus and the first longitudinal bridge, and a connection point between the third capacitor and the first longitudinal bridge is located between the first switching transistor and the second switching transistor; and a fourth capacitor, where the fourth capacitor is connected between the bus and the second longitudinal bridge, and a connection point between the fourth capacitor and the second longitudinal bridge is located between the third switching transistor and the fourth switching transistor. The first switching transistor, the second switching transistor, the third switching transistor, and the fourth switching transistor may be MOS transistors or IGBT devices.

In this embodiment, based on an existing inverter circuit in a HERIC topology, the third capacitor and the fourth capacitor are respectively bridge-connected between the first longitudinal bridge and the bus and between the second longitudinal bridge and the bus, so that in a process in which the first switching transistor and the fourth switching transistor are turned off, the third capacitor can stabilize a voltage difference generated by different turn-off speeds of the two switching transistors. This prevents a resonance phenomenon, and effectively avoids an EMC problem caused by the resonance phenomenon. Similarly, in a process in which the second switching transistor and the third switching transistor are turned off, the fourth capacitor can stabilize a voltage difference generated by different turn-off speeds of the two switching transistors. This stabilizes a voltage in a negative half cycle of converting a direct current into an alternating current, and prevents the resonance phenomenon.

With reference to the first aspect, in a first possible implementation, at least one inductor is disposed in series on a line on which the third capacitor is located, and/or at least one inductor is disposed in series on a line on which the fourth capacitor is located.

In this embodiment, the at least one inductor connected in series to the third capacitor and/or the at least one inductor connected in series to the fourth capacitor can protect the third capacitor and/or the fourth capacitor in a charging and discharging process.

With reference to the first aspect, in a second possible implementation, at least one resistor is disposed in series on a line on which the third capacitor is located, and/or at least one resistor is disposed in series on a line on which the fourth capacitor is located.

In this embodiment, the at least one resistor connected in series to the third capacitor and/or the at least one resistor connected in series to the fourth capacitor can protect the third capacitor and/or the fourth capacitor by charging and discharging a current in a charging and discharging process.

With reference to the first aspect, in a third possible implementation, at least one inductor and at least one resistor are disposed in series on a line on which the third capacitor is located, and/or at least one inductor and at least one resistor are disposed in series on a line on which the fourth capacitor is located.

In this embodiment, the at least one resistor and the at least one inductor that are connected in series to the third capacitor and/or the at least one resistor and the at least one inductor that are connected in series to the fourth capacitor can work together to protect the third capacitor and/or the fourth capacitor in a charging and discharging process.

With reference to the first aspect and the first to the third possible implementations of the first aspect, in a fourth possible implementation, both a connection point between the line on which the third capacitor is located and the bus and a connection point between the line on which the fourth capacitor is located and the bus are disposed between the first capacitor and the second capacitor.

In this embodiment, both the third capacitor and the fourth capacitor are bridge-connected between the first capacitor and the second capacitor on the bus, so that the first capacitor and the third capacitor form a parallel circuit, and the second capacitor and the fourth capacitor form a parallel circuit. In this way, when the first switching transistor and the fourth switching transistor are turned on, a voltage of the third capacitor is equal to a voltage of the first capacitor, stabilizing a voltage on the bus, the first longitudinal bridge, and the second longitudinal bridge in a positive half cycle of inverter output. When the second switching transistor and the third switching transistor are turned on, a voltage of the fourth capacitor is equal to a voltage of the second capacitor, stabilizing a voltage on the bus, the first longitudinal bridge, and the second longitudinal bridge in a negative half cycle of inverter output. This prevents resonance. Further, when the first switching transistor, the second switching transistor, the third switching transistor, and the fourth switching transistor are all turned off, the voltage of the first capacitor causes a circuit to sequentially pass through the third capacitor, a first inductor, the alternating current power grid, a second inductor, the fourth capacitor, and the second capacitor. In this case, the third capacitor and the fourth capacitor are charged with ½ bus voltage. When the first switching transistor and the fourth switching transistor are turned on, or the second switching transistor and the third switching transistor are turned on, a voltage discharged by the third capacitor or the fourth capacitor and a voltage discharged by the first capacitor or the second capacitor are equal, and both are ½ bus voltage. Therefore, the circuit loss is relatively small. This not only can effectively prevent resonance caused by different turn-on/turn-off speeds, but also can effectively reduce circuit loss.

With reference to the first aspect and the first to the third possible implementations of the first aspect, in a fifth possible implementation, neither a connection point between the line on which the third capacitor is located and the bus nor a connection point between the line on which the fourth capacitor is located and the bus is disposed between the first capacitor and the second capacitor. Specifically, the connection point between the line on which the third capacitor is located and the bus and the connection point between the line on which the fourth capacitor is located and the bus both are disposed between the first capacitor and the direct current power supply. Alternatively, the connection point between the line on which the third capacitor is located and the bus and the connection point between the line on which the fourth capacitor is located and the bus both are disposed between the second capacitor and the direct current power supply. Alternatively, the connection point between the line on which the third capacitor is located and the bus is disposed between the first capacitor and the direct current power supply, and the connection point between the line on which the fourth capacitor is located and the bus is disposed between the second capacitor and the direct current power supply. Alternatively, the connection point between the line on which the third capacitor is located and the bus is disposed between the second capacitor and the direct current power supply, and the connection point between the line on which the fourth capacitor is located and the bus is disposed between the first capacitor and the direct current power supply.

In this embodiment, neither a bridge-connection point of the third capacitor nor a bridge-connection point of the fourth capacitor is disposed between the first capacitor and the second capacitor. In this case, at a moment at which the first switching transistor and the fourth switching transistor are turned off, the third capacitor can absorb a voltage fluctuation. This stabilizes the circuit. Similarly, at a moment at which the second switching transistor and the third switching transistor are turned off, the fourth capacitor can absorb a voltage fluctuation. This stabilizes the circuit. Therefore, resonance caused by different turn-on/turn-off speeds can be effectively prevented.

With reference to the first aspect and the first to the third possible implementations of the first aspect, in a sixth possible implementation, only one of a connection point between the line on which the third capacitor is located and the bus and a connection point between the line on which the fourth capacitor is located and the bus is disposed between the first capacitor and the second capacitor. Specifically, the connection point between the third capacitor and the bus may be disposed between the first capacitor and the second capacitor, and the connection point between the line on which the fourth capacitor is located and the bus may be disposed between the first capacitor and the direct current power supply or between the second capacitor and the direct current power supply. Alternatively, the connection point between the fourth capacitor and the bus may be disposed between the first capacitor and the second capacitor, and the connection point between the line on which the third capacitor is located and the bus may be disposed between the first capacitor and the direct current power supply or between the second capacitor and the direct current power supply.

In this embodiment, one of the third capacitor or the fourth capacitor is bridge-connected between the first capacitor and the second capacitor, and the other capacitor is bridge-connected between the capacitor group and the direct current power supply, so that the third capacitor can absorb a voltage fluctuation at a moment at which the first switching transistor and the fourth switching transistor are turned off. This stabilizes the circuit. Similarly, the fourth capacitor can absorb a voltage fluctuation at a moment at which the second switching transistor and the third switching transistor are turned off. This can effectively prevent resonance caused by different turn-on/turn-off speeds, but causes a specific circuit loss.

With reference to the first aspect and the first to the sixth possible implementations of the first aspect, in a seventh possible implementation, the filter includes the first inductor and the second inductor, and the transverse bridge includes a freewheeling switch group. The first inductor is connected between the first longitudinal bridge and the alternating current power grid, the second inductor is connected between the alternating current power grid and the second longitudinal bridge, and the freewheeling switch group is connected in parallel between the first inductor and the second inductor.

In this embodiment, optionally, the inverter circuit further includes a fifth capacitor. The fifth capacitor is connected in parallel between the first inductor and the second inductor, and the fifth capacitor is configured to stabilize a voltage of the filter.

With reference to the seventh possible implementation of the first aspect, in an eighth possible implementation, the freewheeling switch group includes a fifth switching transistor and a sixth switching transistor that are connected in series. The fifth switching transistor and the sixth switching transistor may be MOS transistors or IGBT devices.

In this embodiment, the fifth switching transistor and the sixth switching transistor are controlled to control a circuit from a starting phase to a freewheeling phase, so that the first inductor and the second inductor that are excited are connected to the alternating current power grid.

It can be learned from the foregoing technical solutions that this embodiment of this application has the following advantages:

In the inverter circuit provided in this embodiment of this application, the capacitors may be bridge-connected to the bus on the first longitudinal bridge and the second longitudinal bridge. In this way, in a working process of the HERIC topology, when the first switching transistor and the fourth switching transistor are turned off or the second switching transistor and the third switching transistor are turned off, the capacitors bridge-connected to the bus can stabilize a voltage fluctuation caused by different turn-off speeds of the switching transistors, and suppress the resonance caused by different turn-on/turn-off speeds of the switching transistors when a power circuit works normally. This resolves an EMC-related problem caused by the resonance.

A second aspect of this application provides an inverter, including a control unit and an inverter power unit, where the control unit is configured to control work of the inverter power unit, and the inverter power unit includes the inverter circuit according to the first aspect or any possible implementations of the first aspect.

It can be learned from the foregoing technical solutions that this embodiment of this application has the following advantages:

In the inverter circuit of the inverter provided in this embodiment of this application, capacitors may be bridge-connected to the bus on the first longitudinal bridge and the second longitudinal bridge. In this way, in a working process of the HERIC topology, when the first switching transistor and the fourth switching transistor are turned off or the second switching transistor and the third switching transistor are turned off, the capacitors bridge-connected to the bus can stabilize a voltage fluctuation caused by different turn-off speeds of the switching transistors, and suppress resonance caused by different turn-on/turn-off speeds of the switching transistors when a power circuit works normally. This resolves an EMC-related problem caused by the resonance.

A third aspect of this application provides a photovoltaic power system, including a photovoltaic panel, an inverter, and an alternating current power grid, where the photovoltaic panel is connected to the inverter, and the inverter is connected to the alternating current power grid; the photovoltaic panel is configured to convert light energy into a direct current; the inverter includes the inverter circuit according to the first aspect or any possible implementations of the first aspect, and is configured to convert the direct current into an alternating current; the alternating current power grid is configured to transmit the alternating current.

It can be learned from the foregoing technical solutions that this embodiment of this application has the following advantages:

In the photovoltaic power system provided in this embodiment of this application, the inverter implements conversion from the direct current into the alternating current. In the inverter circuit of the inverter, capacitors may be bridge-connected to the bus on the first longitudinal bridge and the second longitudinal bridge. In this way, in a working process of the HERIC topology, when the first switching transistor and the fourth switching transistor are turned off or the second switching transistor and the third switching transistor are turned off, the capacitors bridge-connected to the bus can stabilize a voltage fluctuation caused by different turn-off speeds of the switching transistors, and suppress resonance caused by different turn-on/turn-off speeds of the switching transistors when a power circuit works normally. This resolves an EMC-related problem caused by the resonance.

DESCRIPTION OF EMBODIMENTS

The following describes the embodiments of this application with reference to the accompanying drawings. It is clear that the described embodiments are merely some but not all of the embodiments of this application. A person of ordinary skill in the art may learn that the technical solutions provided in the embodiments of this application are also applicable to a similar technical problem as technology evolves and new scenarios emerge.

In the specification, claims, and accompanying drawings of this application, the terms "first", "second", and so on are intended to distinguish between similar objects, but do not necessarily indicate a specific order or sequence. It should be understood that the data termed in such a way are interchangeable in proper circumstances so that the embodiments described herein can be implemented in an order other than the order illustrated or described herein. Moreover, the terms "include", "comprise" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Inverters are apparatuses that convert a direct current into an alternating current, and have been rapidly developing in recent years along with the development of photovoltaic power industry. A photovoltaic power system includes a plurality of components, such as a photovoltaic module, an inverter, a transformer, and a cable. The inverter is a core component for energy conversion of the photovoltaic power system, and converts a direct current output by the photovoltaic module into an alternating current available for a grid. In addition, inverters are also widely used in other systems that need to convert a direct current into an alternating current.

Figure 1:
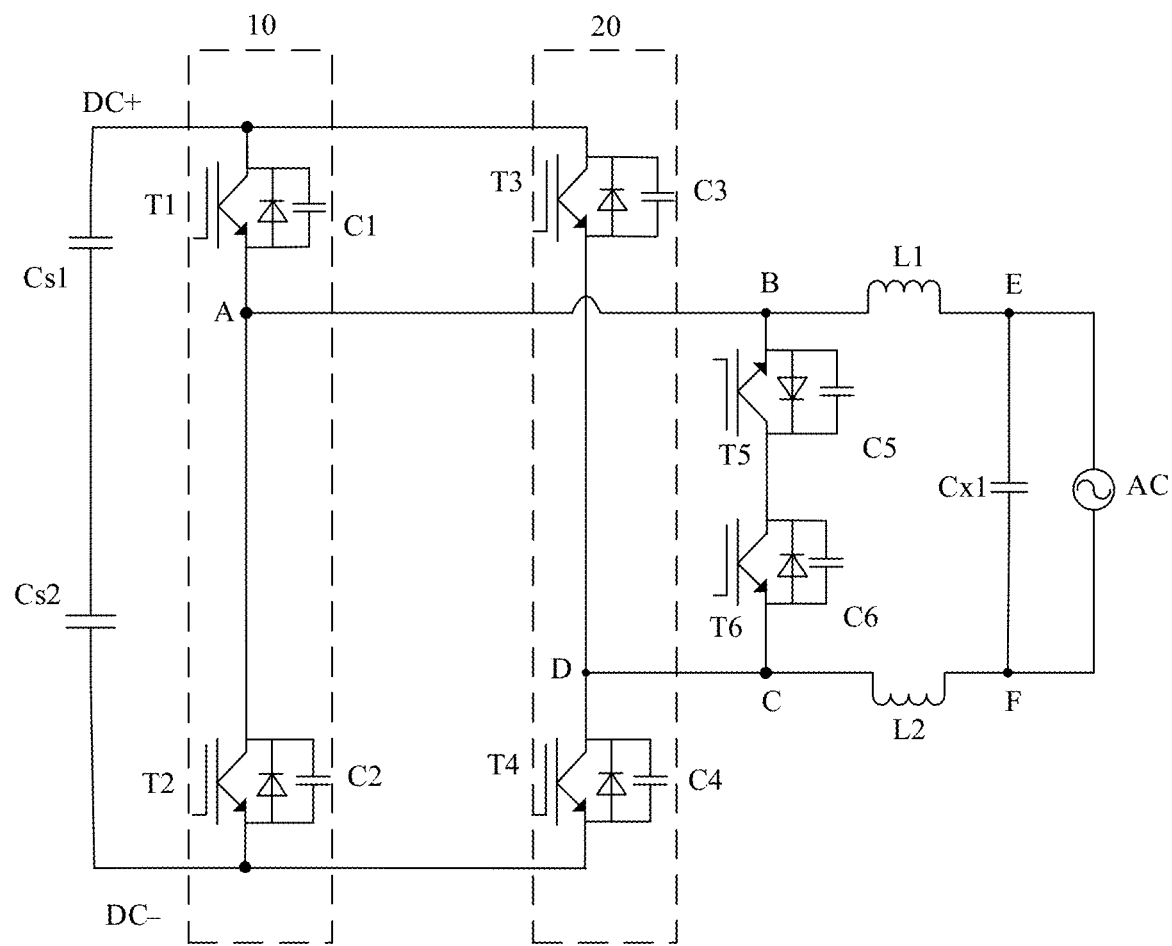
FIG. 1 is a HERIC topology structure of an inverter circuit in the conventional technology.

HERIC topologies generated based on a highly efficient and reliable inverter concept (HERIC) are widely used in photovoltaic inverter products thanks to its low costs. As shown in FIG. 1, in the conventional technology, a HERIC topology includes a first longitudinal bridge 10 and a second longitudinal bridge 20. Two ends of the first longitudinal bridge 10 are respectively connected to a first switching transistor T1 and a second switching transistor T2. Two ends of the second longitudinal bridge 20 are respectively connected to a third switching transistor T3 and a fourth switching transistor T4. In an upper half cycle of inverter output, the first switching transistor T1 and the fourth switching transistor T4 are turned on. When a freewheeling phase is entered, the first switching transistor T1 and the fourth switching transistor T4 are simultaneously turned off. In practice, turn-off speeds of the first switching transistor T1 and the fourth switching transistor T4 cannot maintain complete consistency. For example, a turn-off speed of the fourth switching transistor T4 is faster than that of the first switching transistor T1. In this case, a voltage on a bus, the first longitudinal bridge 10, and the second longitudinal bridge 20 increases. After the first switching transistor T1 is turned off, the voltage falls back. A resonance phenomenon occurs in this process. Consequently, this impacts the electromagnetic compatibility (EMC) for a device and a system, which need to work normally in their electromagnetic environment without causing unacceptable electromagnetic interference to anything in the environment. As a result, conduction and radiation test results of the EMC exceed thresholds.

Therefore, to resolve the foregoing problem, an embodiment of this application provides an inverter circuit. A solution in which a capacitor is bridge-connected to a bus at a location of a connection point between a longitudinal bridge and a transverse bridge in a HERIC topology can suppress resonance caused by different turn-off speeds of switching transistors when a power circuit works normally.

It should be noted that the inverter circuit and the inverter provided in the embodiments of this application may be a photovoltaic inverter used in a photovoltaic power system, or may be used in another circuit or apparatus that needs to convert a direct current into an alternating current. This is not limited in the embodiments of this application. For ease of understanding, a photovoltaic inverter is used as an example in this embodiment of this application to describe in detail the inverter provided in this embodiment of this application.

The following describes in detail the inverter circuit provided in this embodiment of this application with reference to the accompanying drawings.

As shown in FIG. 1, based on the HERIC topology in the conventional technology, the inverter circuit provided in this embodiment of this application specifically includes the bus, the first longitudinal bridge 10, the second longitudinal bridge 20, a transverse bridge, and a filter. A capacitor group is disposed on the bus, the bus is connected in parallel to a direct current power supply, and the capacitor group includes a first capacitor Cs1 and a second capacitor Cs2 that are disposed in series. The first capacitor Cs1 is connected to a positive electrode DC+ of the direct current power supply, the second capacitor Cs2 is connected to a negative electrode DC− of the direct current power supply, and the first capacitor Cs1 and the second capacitor Cs2 are configured to be charged by the direct current power supply to provide a direct current voltage to the first longitudinal bridge 10, the second longitudinal bridge 20, and the transverse bridge.

The bus is connected in parallel to the first longitudinal bridge 10, the first longitudinal bridge 10 is connected in parallel to the second longitudinal bridge 20, the first longitudinal bridge 10 includes a first switching transistor T1 and a second switching transistor T2 that are connected in series, and a line that connects the first switching transistor T1 and the second switching transistor T2. The second longitudinal bridge 20 includes a third switching transistor T3 and a fourth switching transistor T4 that are connected in series, and a line that connects the third switching transistor T3 and the fourth switching transistor T4. Two ends of the transverse bridge are respectively connected to the first longitudinal bridge 10 and the second longitudinal bridge 20. Specifically, the transverse bridge specifically includes a circuit structure that sequentially passes through a connection point A, a connection point B, a connection point C, and a connection point D. The connection point A is a connection point between the transverse bridge and a first bridge arm 10, and the connection point D is a connection point between the transverse bridge and a second bridge arm 20.

It should be noted that the first longitudinal bridge 10 and the second longitudinal bridge 20 are not limited to the foregoing structure, and may also be a related topology structure variant. For example, the first longitudinal bridge 10 or the second longitudinal bridge 20 have more than two switching transistors. The transverse bridge is also not limited to the foregoing structure, but may also be a related topology structure variant such as a topology structure including a part of the structure of the transverse bridge. This is not limited in this embodiment of this application.

Further, a source of the first switching transistor T1 is connected to a drain of the second switching transistor T2 through a wire, a drain of the first switching transistor T1 is connected to the first capacitor Cs1 through a wire, and a source of the second switching transistor T2 is connected to the second capacitor Cs2 through a wire.

Specifically, the first switching transistor T1, the second switching transistor T2, the third switching transistor T3, and the fourth switching transistor T4 may be MOS transistors, IGBT devices, or other semiconductor devices that have a switching function. This is not limited in this embodiment of this application. In an optional implementation, when the first switching transistor T1, the second switching transistor T2, the third switching transistor T3, and the fourth switching transistor T4 are MOS transistors, a diode and a capacitor may be connected in parallel to each switching transistor. Specifically, a capacitor C1, a capacitor C2, a capacitor C3, and a capacitor C4 may be respectively connected in parallel to the first switching transistor T1, the second switching transistor T2, the third switching transistor T3, and the fourth switching transistor T4. When the switching transistors are MOS transistors, the MOS transistors may be gallium nitride MOS transistors or silicon carbide MOS transistors.

It should be noted that, in an actual physical implementation process of the first capacitor Cs1 and the second capacitor Cs2, the first capacitor Cs1 or the second capacitor Cs2 may be implemented by using one capacitor, or may be implemented by using a plurality of capacitors. This is not limited in this embodiment of this application.

The filter is connected in parallel to the transverse bridge, the filter is connected to an alternating current power grid AC, and the transverse bridge is configured to supply power to the alternating current power grid AC by using the filter. The filter specifically includes a circuit structure that sequentially passes through a connection point B, a connection point E, a connection point F, and a connection point C. The filter is connected in parallel to the transverse bridge through the connection point B and the connection point C, and the filter is connected to the alternating current power grid AC through the connection point E and the connection point F.

Specifically, the filter includes a first inductor L1 and a second inductor L2, and the transverse bridge includes a freewheeling switch group.

The first inductor L1 is connected between the first longitudinal bridge 10 and the alternating current power grid AC, the second inductor L2 is connected between the alternating current power grid AC and the second longitudinal bridge 20, and the freewheeling switch group is connected in parallel between the first inductor L1 and the second inductor L2. The first inductor L1 is connected to the transverse bridge through the connection point B, the second inductor L2 is connected to the transverse bridge through the connection point C, and the first inductor L1 and the second inductor L2 are respectively connected to the alternating current power grid AC through the connection point E and the connection point F.

The first inductor L1 and the second inductor L2 are excited by the direct current power supply when the first switching transistor T1 and the fourth switching transistor T4 are turned on or the second switching transistor T2 and the third switching transistor T3 are turned on.

The freewheeling switch group is turned on when the first switching transistor T1 and the fourth switching transistor T4 are turned off or the second switching transistor T2 and the third switching transistor T3 are turned off, so that the first inductor L1 and the second inductor L2 supply power to the output.

Further, the freewheeling switch group includes a fifth switching transistor T5 and a sixth switching transistor T6 that are connected in series.

The fifth switching transistor T5 is configured to maintain a turned-on state.

The sixth switching transistor T6 is turned on when the first switching transistor T1 and the fourth switching transistor T4 are turned off or the second switching transistor T2 and the third switching transistor T3 are turned off, so that the first inductor L1 and the second inductor L2 supply power to the output.

Further, the inverter further includes a fifth capacitor Cx1. The fifth capacitor Cx1 is connected in parallel between the first inductor L1 and the second inductor L2 through the connection point E and the connection point F, and the fifth capacitor Cx1 is configured to stabilize a voltage of the transverse bridge, so that the transverse bridge outputs a stable voltage to the alternating current power grid AC.

Optionally, the fifth switching transistor T5 and the sixth switching transistor T6 are MOS transistors, and the MOS transistors may be MOS transistors, IGBT devices, or other semiconductor devices that have a switching function. This is not limited in this embodiment of this application. In an optional implementation, when the fifth switching transistor T5 and the sixth switching transistor T6 are MOS transistors, a diode and a capacitor C5 may be connected in parallel to the fifth switching transistor T5, and a diode and a capacitor C6 may be connected in parallel to the sixth switching transistor T6. The MOS transistors may be gallium nitride MOS transistors or silicon carbide MOS transistors.

It should be noted that a topology structure on which the inverter circuit in this embodiment of this application is based may be a related topology structure variant of the HERIC topology in addition to the foregoing HERIC topology. This is not limited in this embodiment of this application.

When specifically working, the direct current power supply charges the first capacitor Cs1 and the second capacitor Cs2 on the bus because the bus is connected in parallel to the direct current power supply.

In a starting phase of a positive half cycle of inverter output, the first switching transistor T1 and the fourth switching transistor T4 are turned on. In this case, the first capacitor Cs1 provides the voltage through a positive electrode DC+ of the bus. A current sequentially passes through the first switching transistor T1, the first inductor L1, the second inductor L2, and the fourth switching transistor T4, and finally flows to a negative electrode DC− of the bus, to complete a loop. In this process, the first inductor L1 and the second inductor L2 are charged to excite the first inductor L1 and the second inductor L2.

In a freewheeling phase of the positive half cycle of inverter output, the first switching transistor T1 and the fourth switching transistor T4 are turned off, and the freewheeling switch group is turned on. A specific turn-on implementation of the freewheeling switch group is as follows: The fifth switching transistor T5 always maintains a turn-on state; when the freewheeling switch group needs to change from turn-off to turn-on, the sixth switching transistor T6 changes from turn-off to turn-on, so as to turn on the freewheeling switch group. The first inductor L1 and the second inductor L2 discharge, and a current flows in a loop among the alternating current power grid AC, the first inductor L1, the freewheeling switch group, and the second inductor L2. In this way, in the freewheeling phase, the first inductor L1 and the second inductor L2 continuously charge the alternating current power grid AC, so that the transverse bridge supplies power to the output in a positive half cycle of the alternating current.

In a starting phase of a negative half cycle of inverter output, the second switching transistor T2 and the third switching transistor T3 are turned on. In this case, the second capacitor Cs2 provides a voltage through the negative electrode DC− of the bus. A current sequentially passes through the second switching transistor T2, the first inductor L1, the second inductor L2, and the third switching transistor T3, and finally flows to the positive electrode DC+ of the bus, to complete a loop. In this process, the first inductor L1 and the second inductor L2 are charged to excite the first inductor L1 and the second inductor L2.

In a freewheeling phase of the negative half cycle of inverter output, the second switching transistor T2 and the third switching transistor T3 are turned off, and the freewheeling switch group is turned on. A specific turn-on implementation of the freewheeling switch group is as follows: The fifth switching transistor T5 always maintains a turn-on state; when the freewheeling switch group needs to change from turn-off to turn-on, the sixth switching transistor T6 changes from turn-off to turn-on, so as to turn on the freewheeling switch group. The first inductor L1 and the second inductor L2 discharge, and a current flows in the loop among the alternating current power grid AC, the first inductor L1, the freewheeling switch group, and the second inductor L2. In this way, in the freewheeling phase, the first inductor L1 and the second inductor L2 continuously charge the alternating current power grid AC, so that the transverse bridge supplies power to the output in a negative half cycle of the alternating current.

In the foregoing working process, the inverter circuit in the HERIC topology converts a direct current output by the direct current power supply into an alternating current, to supply power to the alternating current power grid AC.

In some instances, in the process in which the starting phase is changed to the freewheeling phase in the positive half cycle or the negative half cycle, a turn-off speed of the first switching transistor T1 cannot be synchronized with a turn-off speed of the fourth switching transistor T4. For example, the turn-off speed of the fourth switching transistor T4 is faster than the turn-off speed of the first switching transistor T1. When the fourth switching transistor T4 is turned off but the first switching transistor T1 is not turned off, the voltage on the bus, the first longitudinal bridge 10, and the second longitudinal bridge 20 is pulled up to a positive voltage of the bus. After the first switching transistor T1 is turned off, the voltage on the bus, the first longitudinal bridge 10, and the second longitudinal bridge 20 falls back to a midpoint voltage of the bus. In this process, a voltage fluctuation phenomenon causes a resonance phenomenon. Consequently, this impacts the electromagnetic compatibility (EMC) for a device and a system, which need to work normally in their electromagnetic environment without causing unacceptable electromagnetic interference to anything in the environment. As a result, conduction and radiation test results of the EMC exceed thresholds. Similarly, a same problem is also encountered in a process in which the second switching transistor T2 and the third switching transistor T3 are turned off.

To resolve the foregoing problem, a third capacitor Csy1 and a fourth capacitor Csy2 are bridge-connected to the inverter circuit provided in this embodiment of this application based on the existing HERIC topology.

Figure 2:
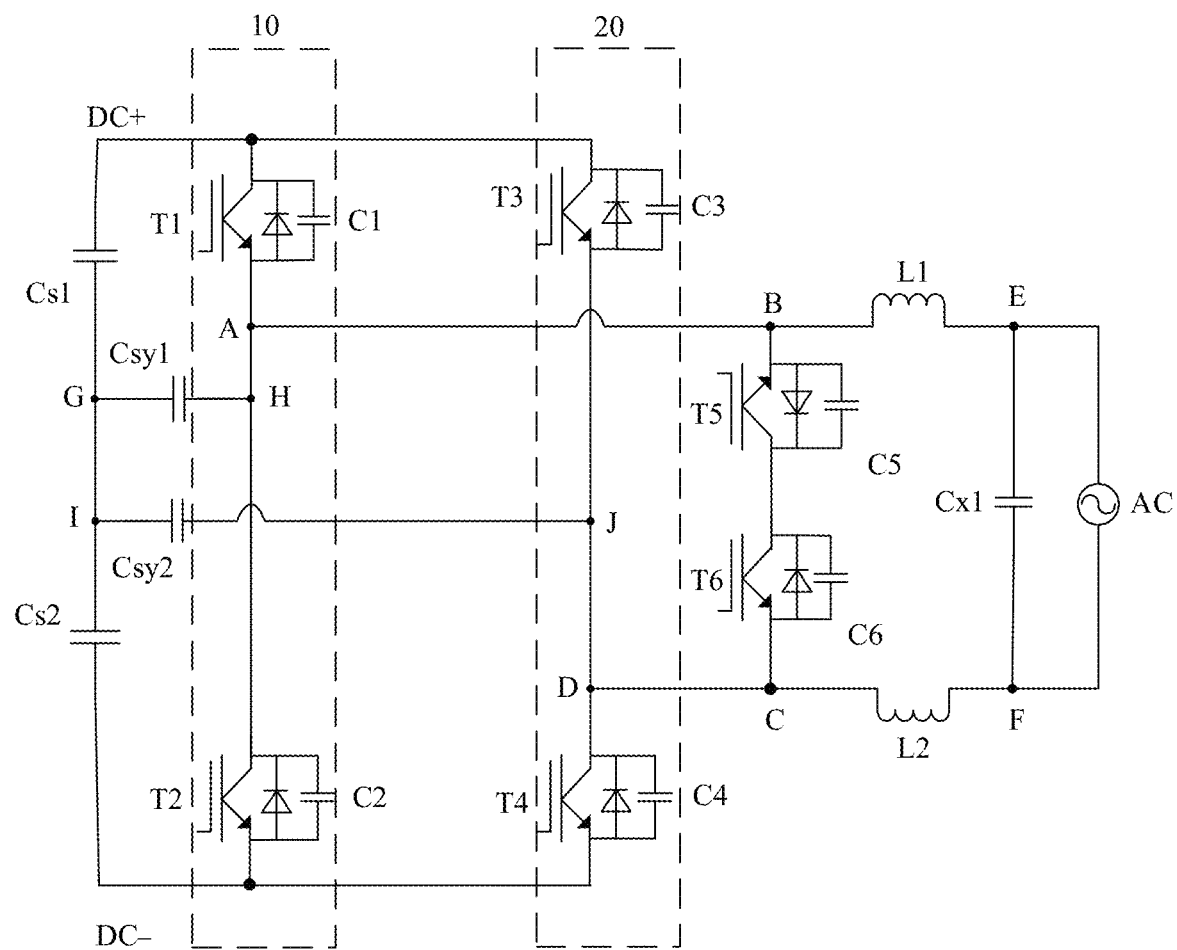
FIG. 2 is a circuit diagram of an implementation of an inverter circuit according to an embodiment of this application.

As shown in FIG. 2, the third capacitor Csy1 is connected between the bus and the first longitudinal bridge 10, and a connection point H between the third capacitor Csy1 and the first longitudinal bridge 10 is located between the first switching transistor T1 and the second switching transistor T2.

The fourth capacitor Csy2 is connected between the bus and the second longitudinal bridge 20, and a connection point J between the fourth capacitor Csy2 and the second longitudinal bridge 20 is located between the third switching transistor T3 and the fourth switching transistor T4.

The third capacitor Csy1 is configured to stabilize the voltage on the bus, the first longitudinal bridge 10, and the second longitudinal bridge 20 when the first switching transistor T1 and the fourth switching transistor T4 are turned off.

The fourth capacitor Csy2 is configured to stabilize the voltage on the bus, the first longitudinal bridge 10, and the second longitudinal bridge 20 when the second switching transistor T2 and the third switching transistor T3 are turned off.

As shown in FIG. 2, a connection point G between the third capacitor Csy1 and the bus is disposed between the first capacitor Cs1 and the second capacitor Cs2, and the third capacitor Csy1 is connected to the first longitudinal bridge 10 through the connection point H. A connection point I between the fourth capacitor Csy2 and the bus is disposed between the first capacitor Cs1 and the second capacitor Cs2, and the fourth capacitor Csy2 is connected to the second longitudinal bridge 20 through the connection point J.

In this embodiment, in the starting phase of the positive half cycle of inverter output, the first switching transistor T1 and the fourth switching transistor T4 are turned on. In this case, the first capacitor Cs1 and the third capacitor Csy1 form a parallel equivalent circuit. The first capacitor Cs1 charges the third capacitor Csy1, and voltages of the first capacitor Cs1 and the third capacitor Csy1 are equal. Because the first capacitor Cs1 and the second capacitor Cs2 form a voltage divider circuit of the direct current power supply, the voltages of the first capacitor Cs1 and the second capacitor Cs2 each are equal to ½ of the bus voltage, that is, the ½ bus voltage. In this case, the voltage of the third capacitor Csy1 is also equal to the ½ bus voltage. In the freewheeling phase of the positive half cycle of inverter output, the first switching transistor T1 and the fourth switching transistor T4 are turned off. If the turn-off speed of the fourth switching transistor T4 is faster than the turn-off speed of the first switching transistor T1, the third capacitor Csy1 can be further charged by a capacitor with the positive voltage of the bus when the fourth switching transistor T4 is turned off but the first switching transistor T1 is not turned off, to avoid fluctuations caused by a voltage increase. If the turn-off speed of the fourth switching transistor T4 is slower than the turn-off speed of the first switching transistor T1, when the first switching transistor T1 is turned off but the fourth switching transistor T4 is not turned off, the ½ bus voltage output by the third capacitor Csy1 can play a stabilizing role, preventing the fluctuation caused by the voltage increase on the bus, the first longitudinal bridge 10, and the second longitudinal bridge 20. This effectively prevents resonance caused by the different turn-off speeds of the first switching transistor T1 and the fourth switching transistor T4 in the working process of the inverter circuit in the HERIC topology.

In the starting phase of the negative half cycle of inverter output, the second switching transistor T2 and the third switching transistor T3 are turned on. In this case, the second capacitor Cs2 and the fourth capacitor Csy2 form a parallel equivalent circuit. The second capacitor Cs2 charges the fourth capacitor Csy2, and voltages of the second capacitor Cs2 and the fourth capacitor Csy2 are equal. Because the first capacitor Cs1 and the second capacitor Cs2 form a voltage divider circuit of the direct current power supply, the voltages of the first capacitor Cs1 and the second capacitor Cs2 each are equal to ½ of the bus voltage, that is, the ½ bus voltage. In this case, the voltage of the fourth capacitor Csy2 is also equal to the ½ bus voltage. In the freewheeling phase of the negative half cycle of inverter output, the second switching transistor T2 and the third switching transistor T3 are turned off. If the turn-off speed of the third switching transistor T3 is faster than the turn-off speed of the second switching transistor T2, the fourth capacitor Csy2 can be further charged by a capacitor with the positive voltage of the bus when the third switching transistor T3 is turned off but the second switching transistor T2 is not turned off, to avoid fluctuations caused by a voltage increase. If the turn-off speed of the third switching transistor T3 is slower than the turn-off speed of the second switching transistor T2, the ½ bus voltage output by the fourth capacitor Csy2 can play a stabilizing role when the second switching transistor T2 is turned off but the third switching transistor T3 is not turned off, preventing the fluctuation caused by the voltage increase on the bus, the first longitudinal bridge 10, and the second longitudinal bridge 20. This effectively prevents resonance caused by the different turn-off speeds of the second switching transistor T2 and the third switching transistor T3 in a working process of the inverter in the HERIC topology.

A difference between the positive half cycle and the negative half cycle of inverter output lies in: In the positive half cycle, the first capacitor Cs1 is charged by the positive electrode DC+ of the direct current power supply, and charges the third capacitor Csy1 with a ½ positive bus voltage; whereas in the negative half cycle, the second capacitor Cs2 is charged by the negative electrode DC− of the direct current power supply, and charges the fourth capacitor Csy2 with a ½ negative bus voltage.

It should be noted that, in the foregoing first implementation, the third capacitor Csy1 and the fourth capacitor Csy2 are bridge-connected between the first capacitor Cs1 and the second capacitor Cs2 on the bus. In this case, the first capacitor Cs1 and the third capacitor Csy1 form a parallel circuit, and the second capacitor Cs2 and the fourth capacitor Csy2 form a parallel circuit. In this way, when the first switching transistor T1 and the fourth switching transistor T4 are turned on, the voltage of the third capacitor Csy1 is equal to the voltage of the first capacitor Cs1, stabilizing the voltage on the bus, the first longitudinal bridge 10, and the second longitudinal bridge 20 in the positive half cycle of inverter output. When the second switching transistor T2 and the third switching transistor T3 are turned on, the voltage of the fourth capacitor Csy2 is equal to the voltage of the second capacitor Cs2, stabilizing the voltage on the bus, the first longitudinal bridge 10, and the second longitudinal bridge 20 in the negative half cycle of inverter output. This prevents resonance. Further, when the first switching transistor T1, the second switching transistor T2, the third switching transistor T3, and the fourth switching transistor T4 are all turned off, the voltage of the first capacitor Cs1 causes a circuit to sequentially pass through the third capacitor Csy1, the first inductor L1, the alternating current power grid AC, the second inductor L2, the fourth capacitor Csy2, and the second capacitor Cs2. In this case, the third capacitor Csy1 and the fourth capacitor Csy2 are charged with ½ bus voltage. When the first switching transistor T1 and the fourth switching transistor T4 are turned on or the second switching transistor T2 and the third switching transistor T3 are turned on, a voltage discharged by the third capacitor Csy1 or the fourth capacitor Csy2 and a voltage discharged by the first capacitor Cs1 or the second capacitor Cs2 are equal and both are the ½ bus voltage. Therefore, a circuit loss is relatively small. In this way, the first implementation in this embodiment of this application not only can effectively prevent resonance caused by different turn-on/turn-off speeds, but also can effectively reduce a circuit loss.

It should be noted that, in an actual physical implementation process of the third capacitor Csy1 and the fourth capacitor Csy2, the third capacitor Csy1 or the fourth capacitor Csy2 may be implemented by using one capacitor, or may be implemented by using a plurality of capacitors. This is not limited in this embodiment of this application.

It should be further noted that, modes in which the connection point G between the third capacitor Csy1 and the bus and the connection point I between the fourth capacitor Csy2 and the bus are connected to the bus are merely the first implementation provided in this embodiment of this application. Optionally, different working modes may be used to stabilize the voltage on the bus, the first longitudinal bridge 10, and the second longitudinal bridge 20 based on different locations of the connection point. Specifically, the working modes further include:

1. Both a connection point between a line on which the third capacitor is located and the bus and a connection point between a line on which the fourth capacitor is located and the bus are disposed between the capacitor group and the direct current power supply.
2. Neither the connection point between the line on which the third capacitor is located and the bus nor the connection point between the line on which fourth capacitor is located and the bus is disposed between the first capacitor and the second capacitor.
3. Only one of the connection point between the line on which the third capacitor is located and the bus and the connection point between the line on which the fourth capacitor is located and the bus is disposed between the first capacitor and the second capacitor.

For ease of understanding, with reference to the accompanying drawings, different connection cases of the third capacitor Csy1 and the fourth capacitor Csy2 in the inverter circuit in this embodiment of this application are described in detail below.

(1) Both the third capacitor Csy1 and the fourth capacitor Csy2 are bridge-connected between the first capacitor Cs1 on the bus and the positive electrode of the direct current power supply.

Figure 3:
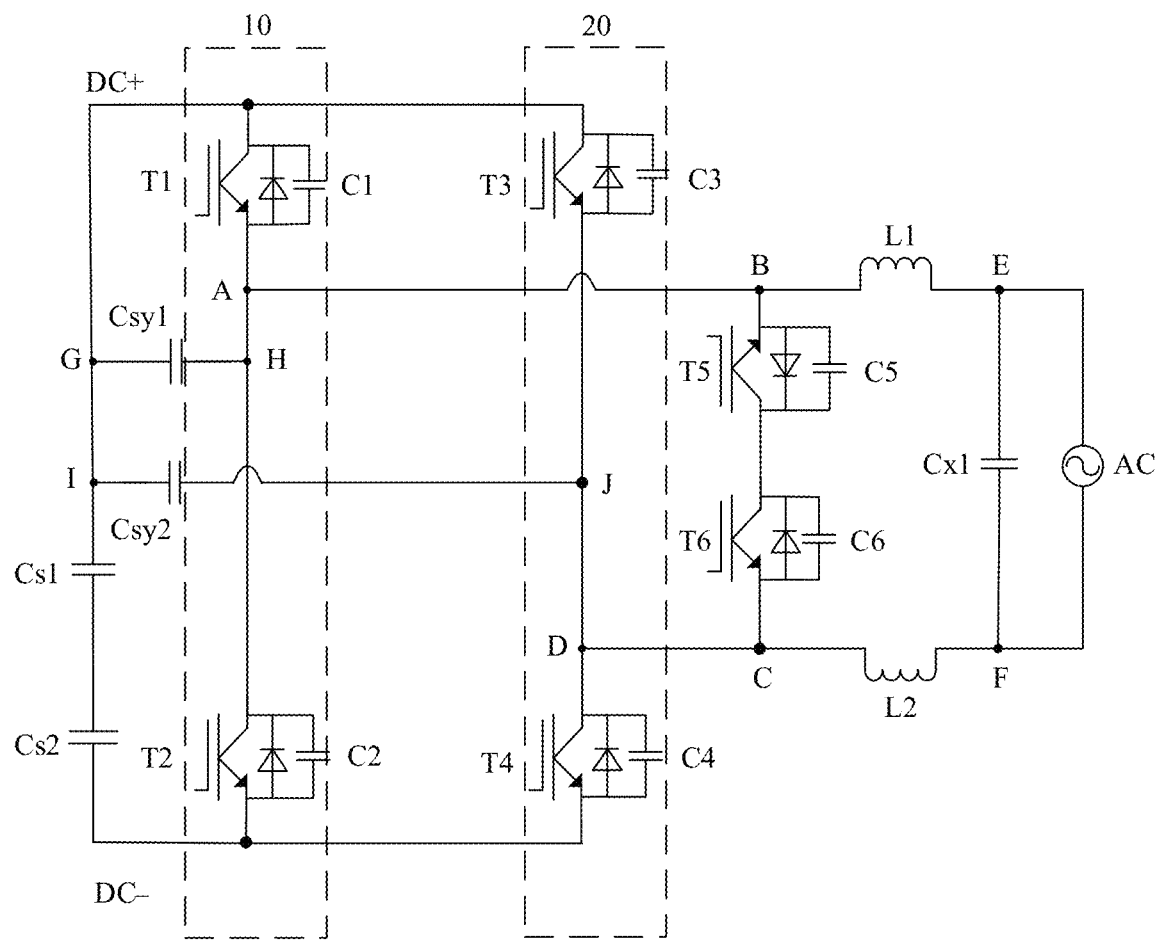
FIG. 3 is a circuit diagram of another implementation of an inverter circuit according to an embodiment of this application.

As shown in FIG. 3, in a second implementation, the connection point G between the third capacitor Csy1 and the bus is disposed between the first capacitor Cs1 and the positive electrode of the direct current power supply, and the third capacitor Csy1 is connected to the first longitudinal bridge 10 through the connection point H. The connection point I between the fourth capacitor Csy2 and the bus is disposed between the first capacitor Cs1 and the positive electrode of the direct current power supply, and the fourth capacitor Csy2 is connected to the second longitudinal bridge 20 through the connection point J.

In this embodiment, in the starting phase of the positive half cycle of inverter output, the first switching transistor T1 and the fourth switching transistor T4 are turned on. In this case, a current starts from the first capacitor Cs1, and sequentially passes through the first switching transistor T1, the first inductor L1, the alternating current power grid AC, the second inductor L2, the fourth switching transistor T4, and the second capacitor Cs2. In the freewheeling phase of the positive half cycle of inverter output, the first switching transistor T1 and the fourth switching transistor T4 are turned off. If the turn-off speed of the fourth switching transistor T4 is different from the turn-off speed of the first switching transistor T1, the generated positive voltage of the bus charges the third capacitor Csy1, so that the third capacitor Csy1 can absorb an increased voltage on the bus, the first longitudinal bridge 10, and the second longitudinal bridge 20, and the fluctuation caused by the voltage increase is avoided. This effectively prevents resonance caused by the different turn-off speeds of the first switch and the fourth switch in the working process of the inverter circuit in the HERIC topology.

In the starting phase of the negative half cycle of inverter output, the second switching transistor T2 and the third switching transistor T3 are turned on. In this case, a current starts from the second capacitor Cs2, and sequentially passes through the second switching transistor T2, the first inductor L1, the alternating current power grid AC, the second inductor L2, the third switching transistor T3, and the first capacitor Cs1. In the freewheeling phase of the negative half cycle of inverter output, the second switching transistor T2 and the third switching transistor T3 are turned off. If the turn-off speed of the second switching transistor T2 is different from the turn-off speed of the third switching transistor T3, the generated negative voltage of the bus charges the fourth capacitor Csy2, so that the fourth capacitor Csy2 can absorb a voltage change on the bus, the first longitudinal bridge 10, and the second longitudinal bridge 20, and the fluctuation caused by the voltage change is avoided. This effectively prevents resonance caused by the different turn-off speeds of the second switch and the third switch in the working process of the inverter circuit in the HERIC topology.

It should be noted that, in the foregoing second implementation, the third capacitor Csy1 and the fourth capacitor Csy2 are bridge-connected to a positive voltage location of the bus, so that the third capacitor Csy1 can absorb a voltage fluctuation at a moment at which the first switching transistor T1 and the fourth switching transistor T4 are turned off, thereby stabilizing the circuit. Similarly, the fourth capacitor Csy2 can absorb a voltage fluctuation at a moment at which the second switching transistor T2 and the third switching transistor T3 are turned off, thereby stabilizing the circuit. Further, when the first switching transistor T1, the second switching transistor T2, the third switching transistor T3, and the fourth switching transistor T4 are all turned off, the voltage of the first capacitor Cs1 causes a circuit to sequentially pass through the third capacitor Csy1 and the fourth capacitor Csy2, and flow through the entire loop. In this case, the third capacitor Csy1 and the fourth capacitor Csy2 are charged with one bus voltage. When the first switching transistor T1 and the fourth switching transistor T4 are turned on or the second switching transistor T2 and the third switching transistor T3 are turned on, a voltage discharged by the third capacitor Csy1 or the fourth capacitor Csy2 is greater than a voltage discharged by the first capacitor Cs1 or the second capacitor Cs2 (as described above, in the voltage divider circuit including the first capacitor Cs1 and the second capacitor Cs2, the voltage of the first capacitor Cs1 and the voltage of the second capacitor Cs2 both are equal to ½ bus voltage). In this way, when the first switching transistor T1 and the fourth switching transistor T4 are turned on or the second switching transistor T2 and the third switching transistor T3 are turned on, the third capacitor Csy1 or the fourth capacitor Csy2 needs to discharge an extra voltage. This process causes an external circuit loss. In this way, the second implementation in this embodiment of this application can effectively prevent the resonance caused by the different turn-on/turn-off speeds, but causes a specific circuit loss. Therefore, the second implementation may be used as a candidate implementation.

(2) Both the third capacitor Csy1 and the fourth capacitor Csy2 are bridge-connected between the second capacitor Cs2 on the bus and the negative electrode of the direct current power supply.

Figure 4:
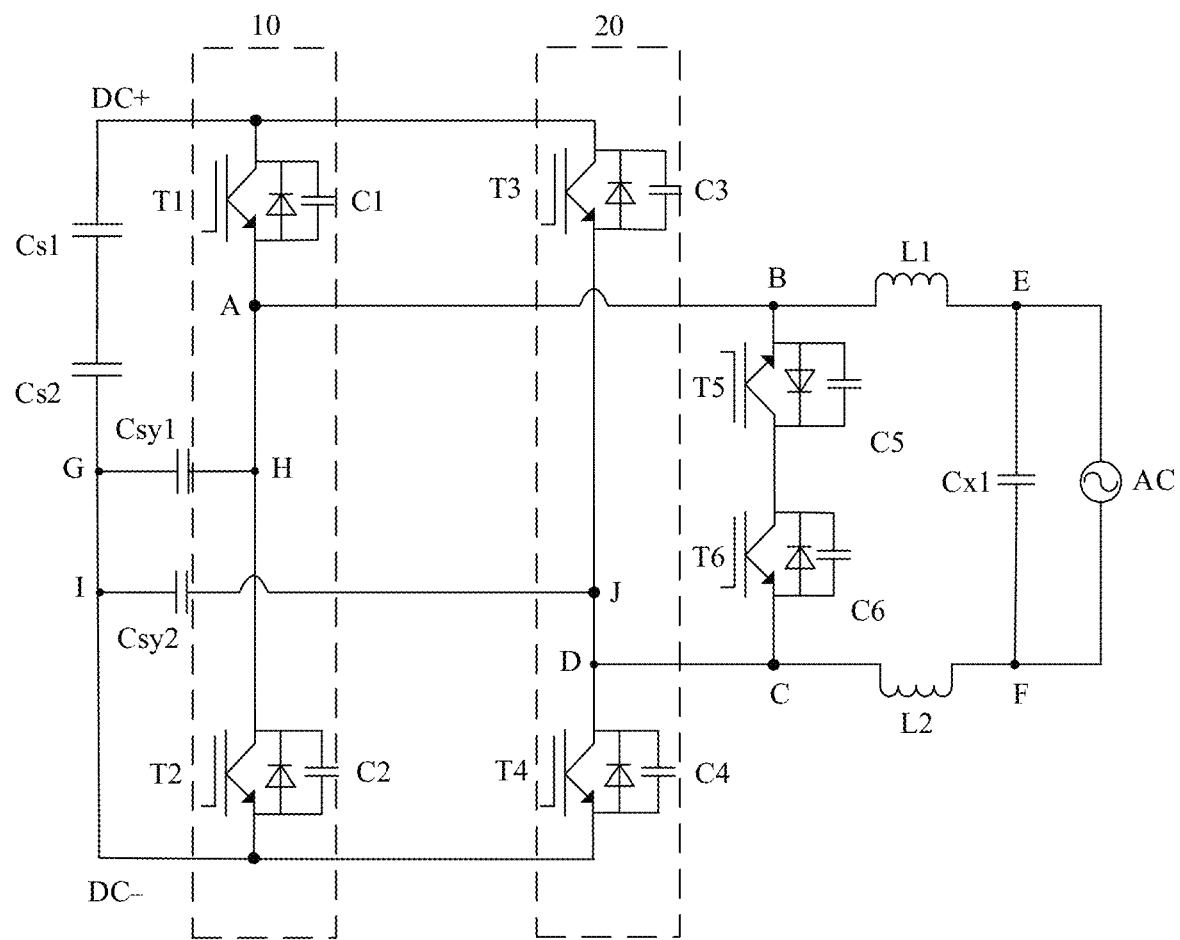
FIG. 4 is a circuit diagram of another implementation of an inverter circuit according to an embodiment of this application.

As shown in FIG. 4, in a third implementation, the connection point G between the third capacitor Csy1 and the bus is disposed between the second capacitor Cs2 and the negative electrode of the direct current power supply, and the third capacitor Csy1 is connected to the first longitudinal bridge 10 through the connection point H. The connection point I between the fourth capacitor Csy2 and the bus is disposed between the second capacitor Cs2 and the negative electrode of the direct current power supply, and the fourth capacitor Csy2 is connected to the second longitudinal bridge 20 through the connection point J.

In this embodiment, in the starting phase of the positive half cycle of inverter output, the first switching transistor T1 and the fourth switching transistor T4 are turned on. In this case, a current starts from the first capacitor Cs1, and sequentially passes through the first switching transistor T1, the first inductor L1, the alternating current power grid AC, the second inductor L2, the fourth switching transistor T4, and the second capacitor Cs2. In the freewheeling phase of the positive half cycle of inverter output, the first switching transistor T1 and the fourth switching transistor T4 are turned off. If the turn-off speed of the fourth switching transistor T4 is different from the turn-off speed of the first switching transistor T1, the generated positive voltage of the bus charges the third capacitor Csy1, so that the third capacitor Csy1 can absorb an increased voltage on the bus, the first longitudinal bridge 10, and the second longitudinal bridge 20, and the fluctuation caused by the voltage increase is avoided. This effectively prevents the resonance caused by the different turn-off speeds of the first switch and the fourth switch in the working process of the inverter circuit in the HERIC topology.

In the starting phase of the negative half cycle of inverter output, the second switching transistor T2 and the third switching transistor T3 are turned on. In this case, a current starts from the second capacitor Cs2, and sequentially passes through the second switching transistor T2, the first inductor L1, the alternating current power grid AC, the second inductor L2, the third switching transistor T3, and the first capacitor Cs1. In the freewheeling phase of the negative half cycle of inverter output, the second switching transistor T2 and the third switching transistor T3 are turned off. If the turn-off speed of the second switching transistor T2 is different from the turn-off speed of the third switching transistor T3, the generated negative voltage of the bus charges the fourth capacitor Csy2, so that the fourth capacitor Csy2 can absorb a voltage change on the bus, the first longitudinal bridge 10, and the second longitudinal bridge 20, and the fluctuation caused by the voltage change is avoided. This effectively prevents resonance caused by the different turn-off speeds of the second switch and the third switch in the working process of the inverter circuit in the HERIC topology.

It should be noted that, in the foregoing third implementation, the third capacitor Csy1 and the fourth capacitor Csy2 are bridge-connected to a negative voltage location of the bus, so that the third capacitor Csy1 can absorb a voltage fluctuation at a moment at which the first switching transistor T1 and the fourth switching transistor T4 are turned off, thereby stabilizing a circuit. Similarly, the fourth capacitor Csy2 can absorb a voltage fluctuation at a moment at which the second switching transistor T2 and the third switching transistor T3 are turned off, thereby stabilizing the circuit. Further, when the first switching transistor T1, the second switching transistor T2, the third switching transistor T3, and the fourth switching transistor T4 are all turned off, the voltage of the first capacitor Cs1 causes a circuit to sequentially pass through the third capacitor Csy1 and the fourth capacitor Csy2, and flow through the entire loop. In this case, the third capacitor Csy1 and the fourth capacitor Csy2 are charged with the voltage of the one bus. When the first switching transistor T1 and the fourth switching transistor T4 are turned on or the second switching transistor T2 and the third switching transistor T3 are turned on, the voltage discharged by the third capacitor Csy1 or the voltage discharged by the fourth capacitor Csy2 is greater than the voltage discharged by the first capacitor Cs1 or the second capacitor Cs2 (as described above, in the voltage divider circuit including the first capacitor Cs1 and the second capacitor Cs2, the voltage of the first capacitor Cs1 and the voltage of the second capacitor Cs2 both are equal to ½ bus voltage). In this way, when the first switching transistor T1 and the fourth switching transistor T4 are turned on or the second switching transistor T2 and the third switching transistor T3 are turned on, the third capacitor Csy1 or the fourth capacitor Csy2 needs to discharge an extra voltage. This process causes an external circuit loss. In this way, the third implementation in this embodiment of this application can effectively prevent the resonance caused by the different turn-on/turn-off speeds, but causes a specific circuit loss. The third implementation and the foregoing second implementation of this application are equivalent. A difference lies in: In the second implementation, the third capacitor Csy1 and the fourth capacitor Csy2 are bridge-connected to the positive voltage location of the bus; whereas in the second implementation, the third capacitor Csy1 and the fourth capacitor Csy2 are bridge-connected to the negative voltage location of the bus. The third implementation may be used as an alternative solution of the foregoing second implementation.

The foregoing describes three solutions that are improved based on the inverter circuit in the HERIC topology in the embodiments of this application. In the first implementation, the third capacitor Csy1 and the fourth capacitor Csy2 are bridge-connected between the first capacitor Cs1 and the second capacitor Cs2 (that is, a midpoint of the bus); in the second implementation, the third capacitor Csy1 and the fourth capacitor Csy2 are bridge-connected between the first capacitor Cs1 and the positive electrode of the direct current power supply (that is, a positive electrode of the bus); in the third implementation, the third capacitor Csy1 and the fourth capacitor Csy2 are bridge-connected between the second capacitor Cs2 and the negative electrode of the direct current power supply (that is, a negative electrode of the bus). Optionally, the following implementations may be further included based on a combination of the foregoing implementations.

In a fourth implementation, the third capacitor Csy1 is bridge-connected to the midpoint of the bus, and the fourth capacitor Csy2 is bridge-connected to the positive electrode of the bus.

Figure 16:
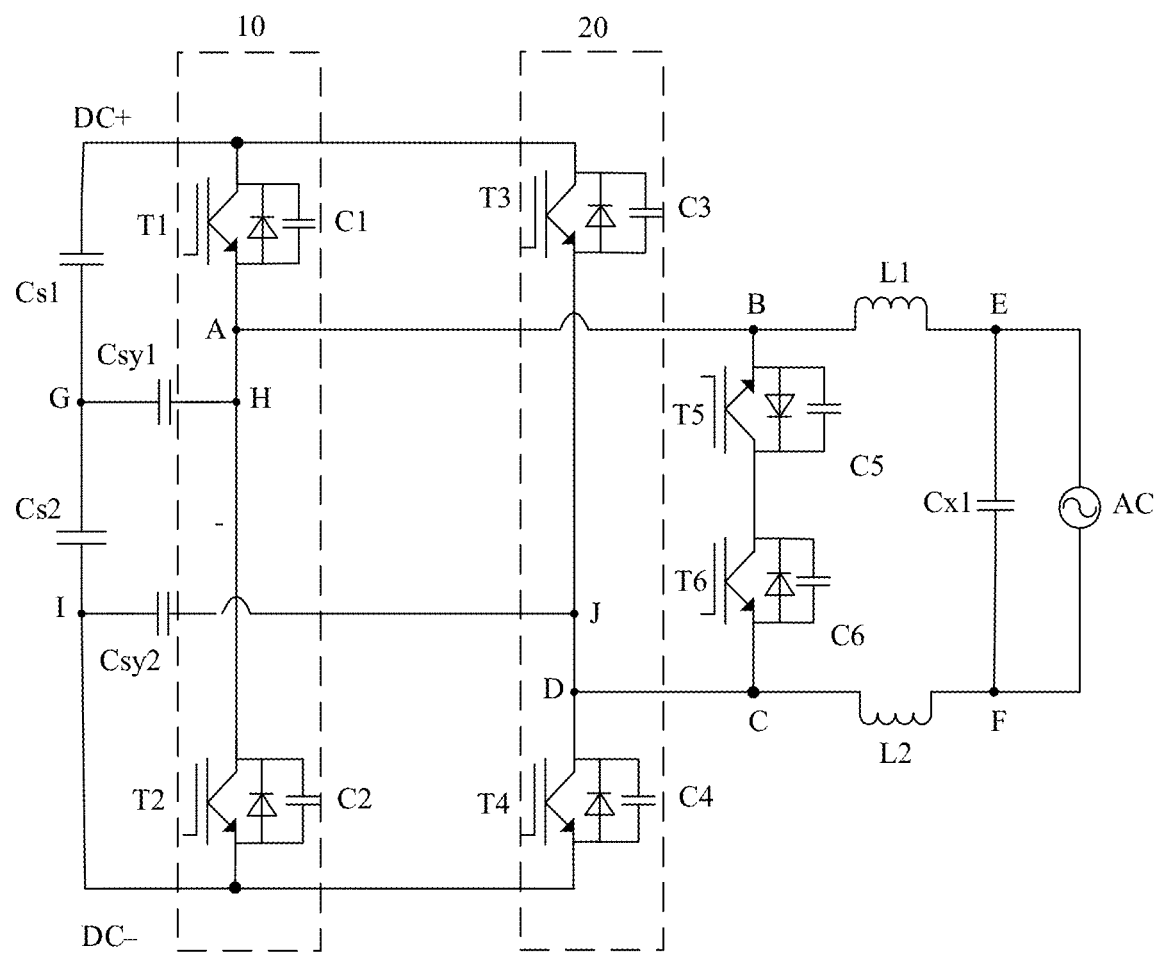
FIG. 16 is a circuit diagram of another implementation of an inverter circuit according to an embodiment of this application.

In a fifth implementation, shown in FIG. 16, the third capacitor Csy1 is bridge-connected to the midpoint of the bus, and the fourth capacitor Csy2 is bridge-connected to the negative electrode of the bus.

In a sixth implementation, the fourth capacitor Csy2 is bridge-connected to the midpoint of the bus, and the third capacitor Csy1 is bridge-connected to the positive electrode of the bus.

In a seventh implementation, the fourth capacitor Csy2 is bridge-connected to the midpoint of the bus, and the third capacitor Csy1 is bridge-connected to the negative electrode of the bus.

Figure 17:
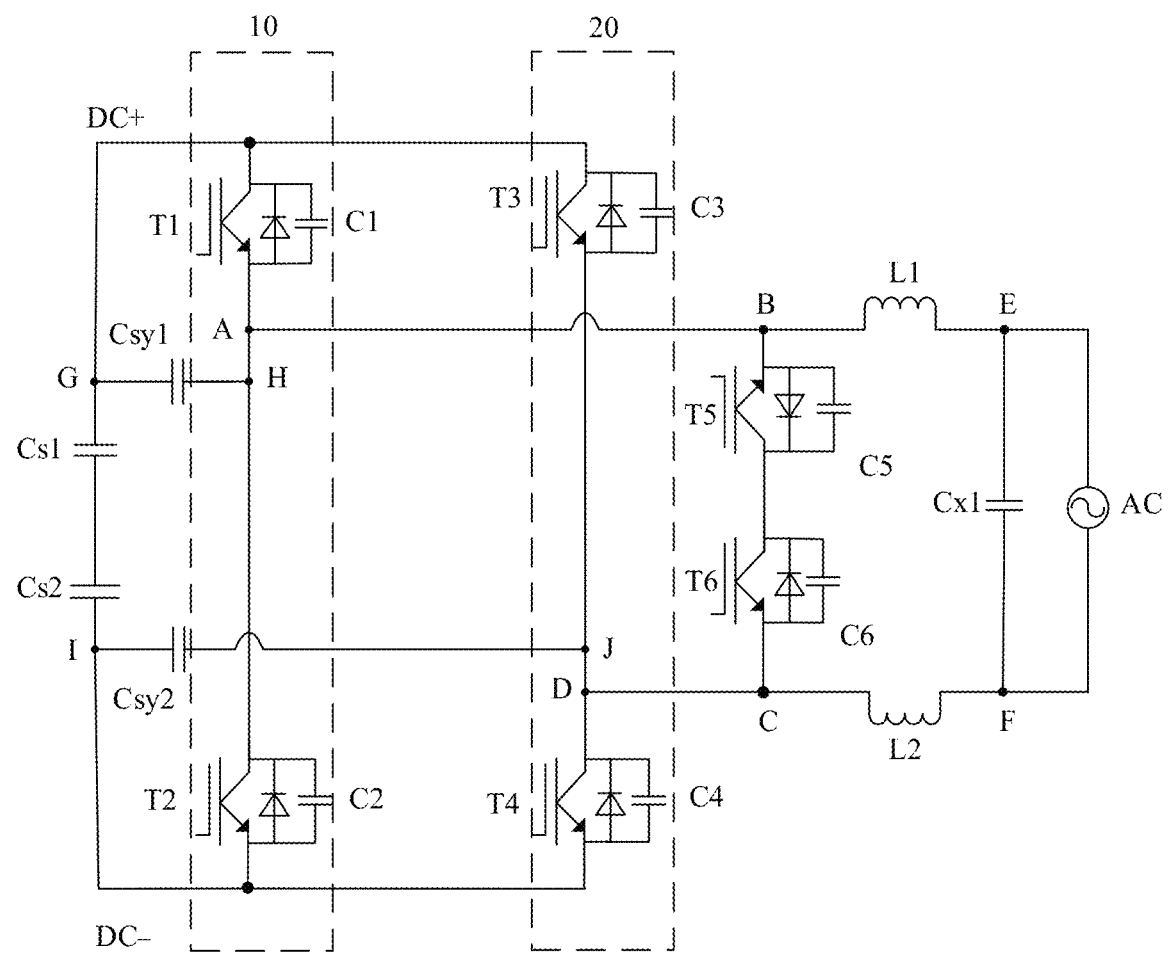
FIG. 17 is a circuit diagram of another implementation of an inverter circuit according to an embodiment of this application.

In an eighth implementation, shown in FIG. 17, the third capacitor Csy1 is bridge-connected to the positive electrode of the bus, and the fourth capacitor Csy2 is bridge-connected to the negative electrode of the bus.

In a ninth implementation, the third capacitor Csy1 is bridge-connected to the negative electrode of the bus, and the fourth capacitor Csy2 is bridge-connected to the positive electrode of the bus.

In the foregoing fourth to ninth implementations, for connection solutions and working principles of bridge-connection modes of the third capacitor Csy1 and the fourth capacitor Csy2, refer to the foregoing first to third implementations. A difference lies only in different combinations of the bridge-connection modes. Details are not described herein again.

It should be noted that, in any one of the foregoing embodiments, an impedance network may be connected in series to the third capacitor Csy1 and the fourth capacitor Csy2, to protect charging stability of the third capacitor Csy1 and the fourth capacitor Csy2. In this way, in a process of charging the third capacitor Csy1 and the fourth capacitor Csy2, the charging stability of the third capacitor Csy1 and the fourth capacitor Csy2 is maintained. Specifically, the impedance network includes at least one inductor and/or at least one resistor that are connected in series. For ease of understanding, different cases of the impedance network are specifically described below with reference to the accompanying drawings.

Figure 5:
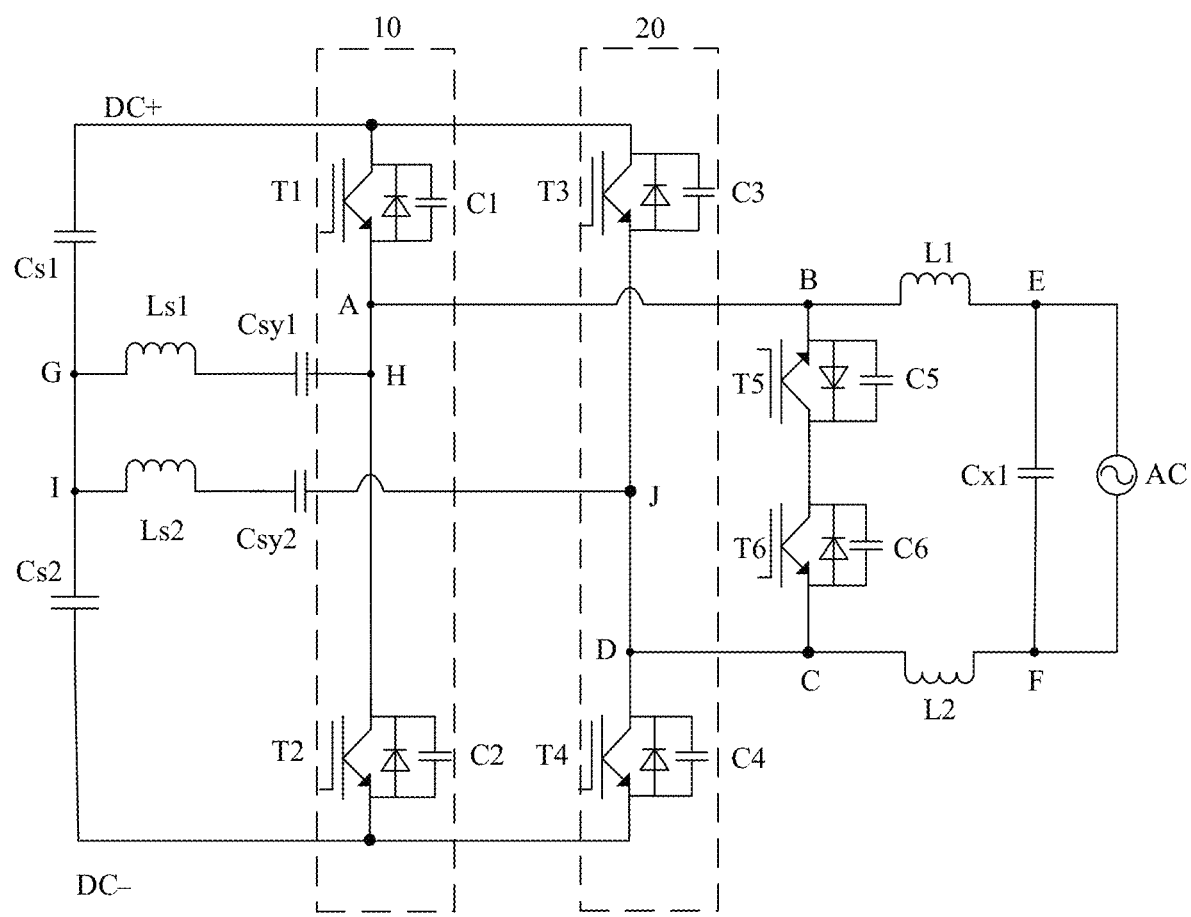
FIG. 5 is a circuit diagram of another implementation of an inverter circuit according to an embodiment of this application.

As shown in FIG. 5, based on the first implementation of this embodiment of this application, the inductor Ls1 and the inductor Ls2 are respectively disposed in series with the third capacitor Csy1 and the fourth capacitor Csy2. The inductor Ls1 is connected in series to the third capacitor Csy1, and the inductor Ls2 is connected in series to the fourth capacitor Csy2.

In this embodiment, in a process in which the third capacitor Csy1 and the fourth capacitor Csy2 are charged, the inductor Ls1 and the inductor Ls2 can share a current flowing into the third capacitor Csy1 and the fourth capacitor Csy2, to prevent the third capacitor Csy1 and the fourth capacitor Csy2 from being damaged due to instantaneous charging by an excessive current. When the charging of the third capacitor Csy1 and the fourth capacitor Csy2 is completed, the inductor Ls1 and the inductor Ls2 may release the charged current, and slowly charge the third capacitor Csy1 and the fourth capacitor Csy2, so that a large current does not damage the third capacitor Csy1 and the fourth capacitor Csy2, and does not waste an excess current.

Figure 6:
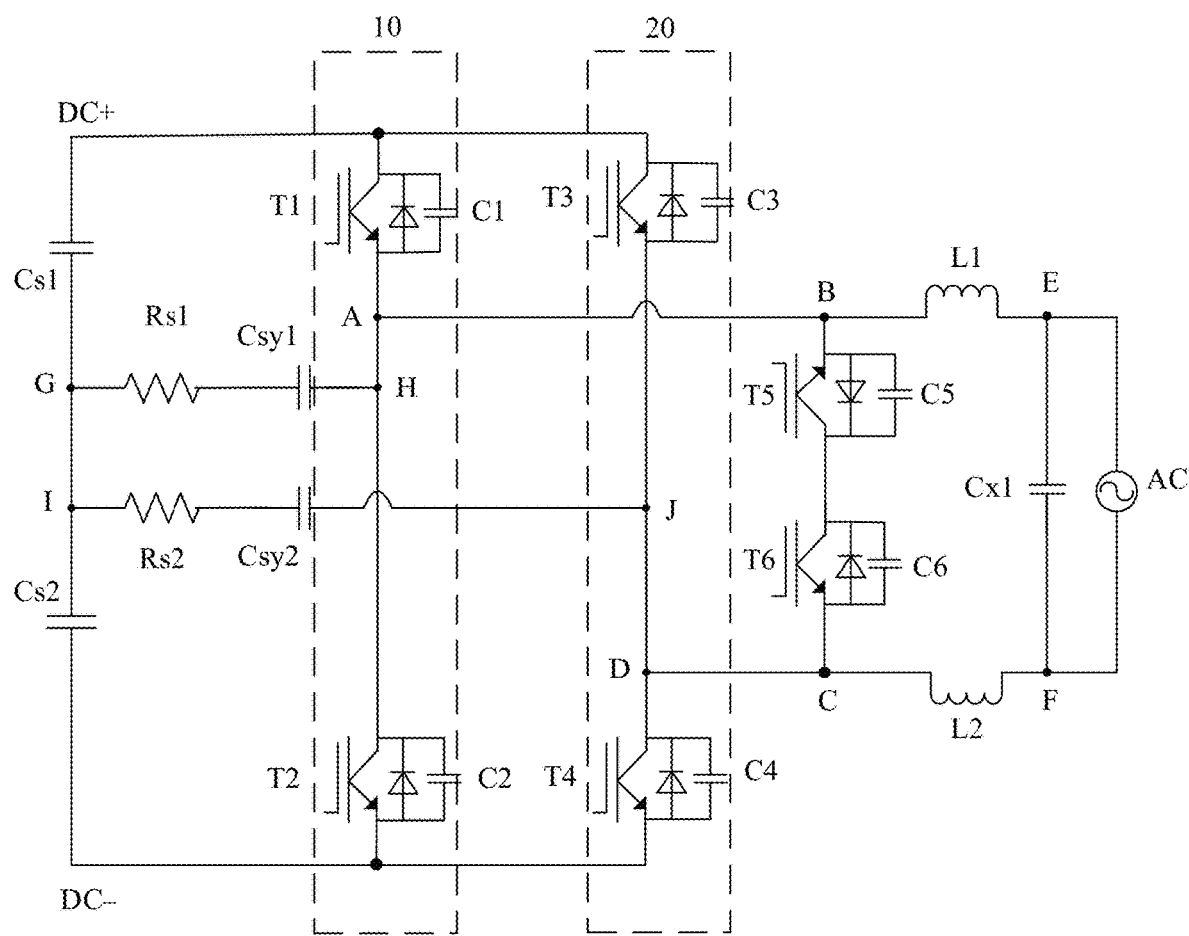
FIG. 6 is a circuit diagram of another implementation of an inverter circuit according to an embodiment of this application.

Further, as shown in FIG. 6, based on the first implementation of this embodiment of this application, a resistor Rs1 and a resistor Rs2 are respectively disposed in series on the third capacitor Csy1 and the fourth capacitor Csy2. The resistor Rs1 is connected in series to the third capacitor Csy1, and the resistor Rs2 is connected in series to the fourth capacitor Csy2.

In this embodiment, in a process in which the third capacitor Csy1 and the fourth capacitor Csy2 are charged, if a charged current is excessively large, the resistor Rs1 and the resistor Rs2 respectively connected in series to the third capacitor Csy1 and the fourth capacitor Csy2 can convert extra electric energy. This protects the third capacitor Csy1 and the fourth capacitor Csy2, and prevents the third capacitor Csy1 and the fourth capacitor Csy2 from being damaged due to charging by a large current.

Figure 7:
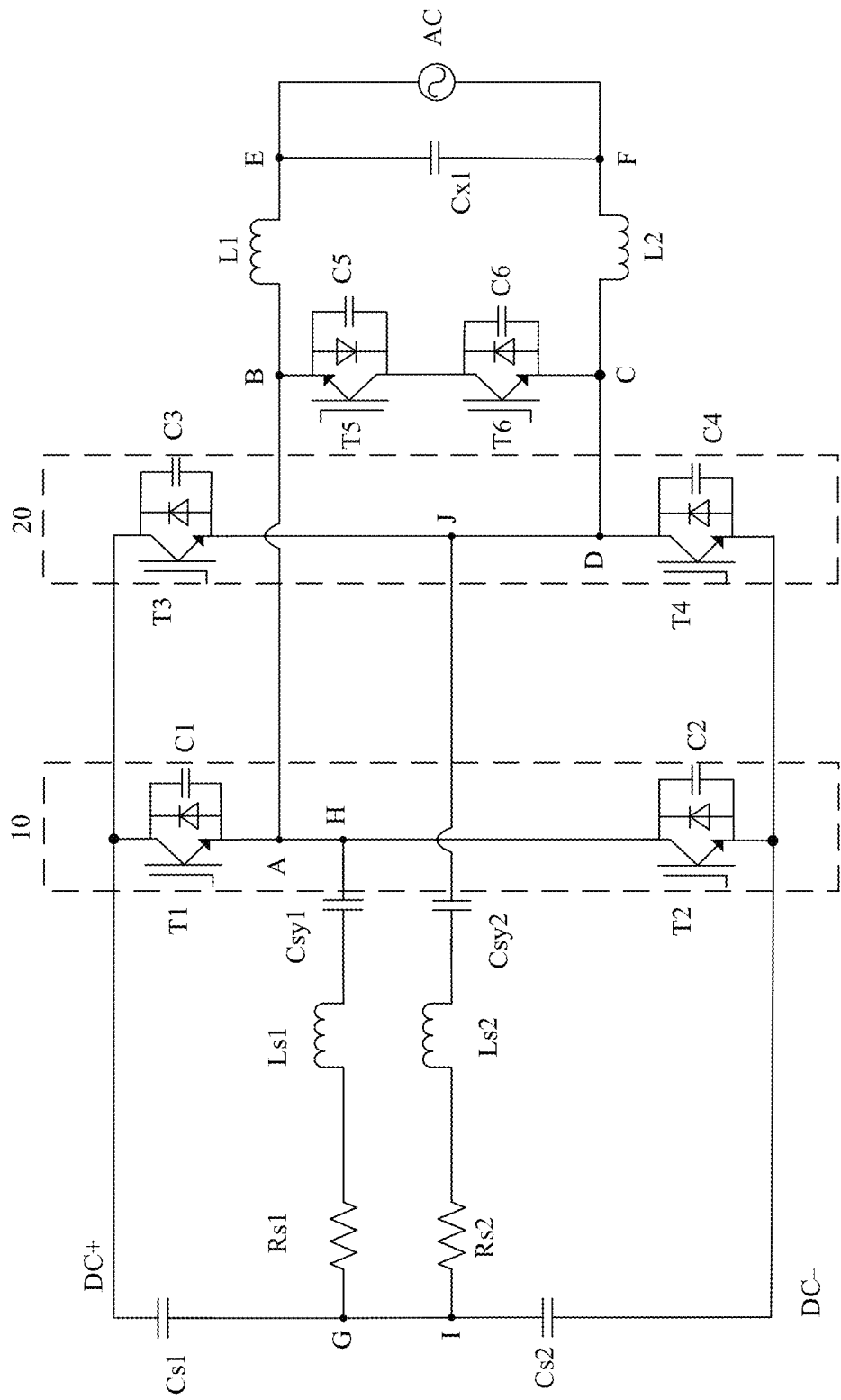
FIG. 7 is a circuit diagram of another implementation of an inverter circuit according to an embodiment of this application.

Further, as shown in FIG. 7, based on the first implementation of this embodiment of this application, the inductor Ls1, the inductor Ls2, the resistor Rs1, and the resistor Rs2 are disposed in series with the third capacitor Csy1 and the fourth capacitor Csy2. The inductor Ls1 and the resistor Rs1 are connected in series to the third capacitor Csy1, and the inductor Ls2 and the resistor Rs2 are connected in series to the fourth capacitor Csy2.

In this embodiment, in a process in which the third capacitor Csy1 and the fourth capacitor Csy2 are charged, the inductor Ls1 and the inductor Ls2 can share a current flowing into the third capacitor Csy1 and the fourth capacitor Csy2, to prevent the third capacitor Csy1 and the fourth capacitor Csy2 from being damaged due to instantaneous charging by an excessive current. Further, the resistor Rs1 and the resistor Rs2 that are connected in series can convert extra electric energy. This further protects the third capacitor Csy1 and the fourth capacitor Csy2, and prevents the third capacitor Csy1 and the fourth capacitor Csy2 from being damaged due to charging of a large current.

Figure 8:
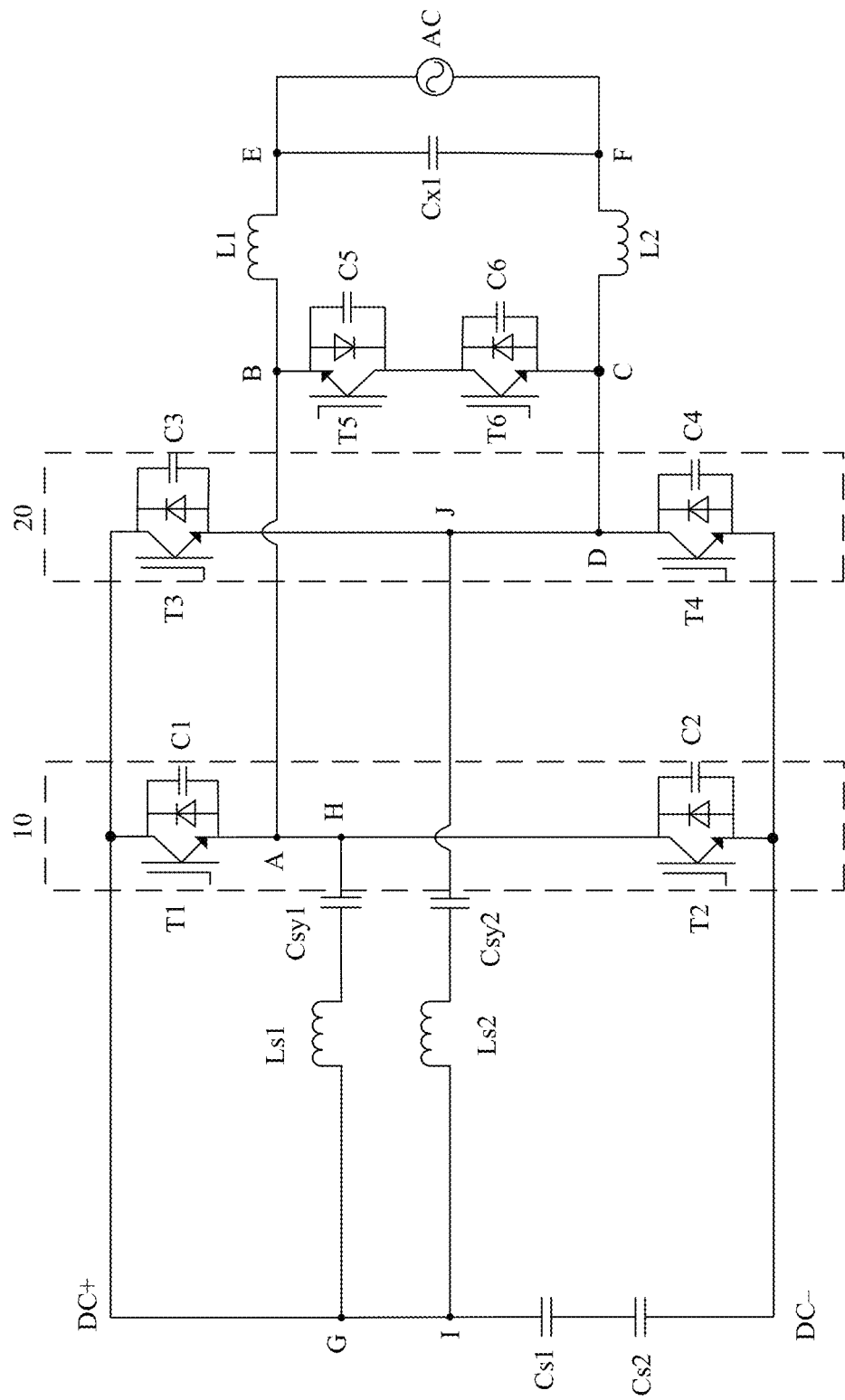
FIG. 8 is a circuit diagram of another implementation of an inverter circuit according to an embodiment of this application.

As shown in FIG. 8, based on the second implementation of this embodiment of this application, the inductor Ls1 and the inductor Ls2 are respectively disposed in series on the third capacitor Csy1 and the fourth capacitor Csy2. The inductor Ls1 is connected in series to the third capacitor Csy1, and the inductor Ls2 is connected in series to the fourth capacitor Csy2.

In this embodiment, in a process in which the third capacitor Csy1 and the fourth capacitor Csy2 are charged, the inductor Ls1 and the inductor Ls2 can share a current charged into the third capacitor Csy1 and the fourth capacitor Csy2, to prevent the third capacitor Csy1 and the fourth capacitor Csy2 from being damaged due to instantaneous charging by an excessive current. When the charging of the third capacitor Csy1 and the fourth capacitor Csy2 is completed, the inductor Ls1 and the inductor Ls2 may release the charged current, and slowly charge the third capacitor Csy1 and the fourth capacitor Csy2, so that a large current does not damage the third capacitor Csy1 and the fourth capacitor Csy2, and does not waste an excess current.

Figure 9:
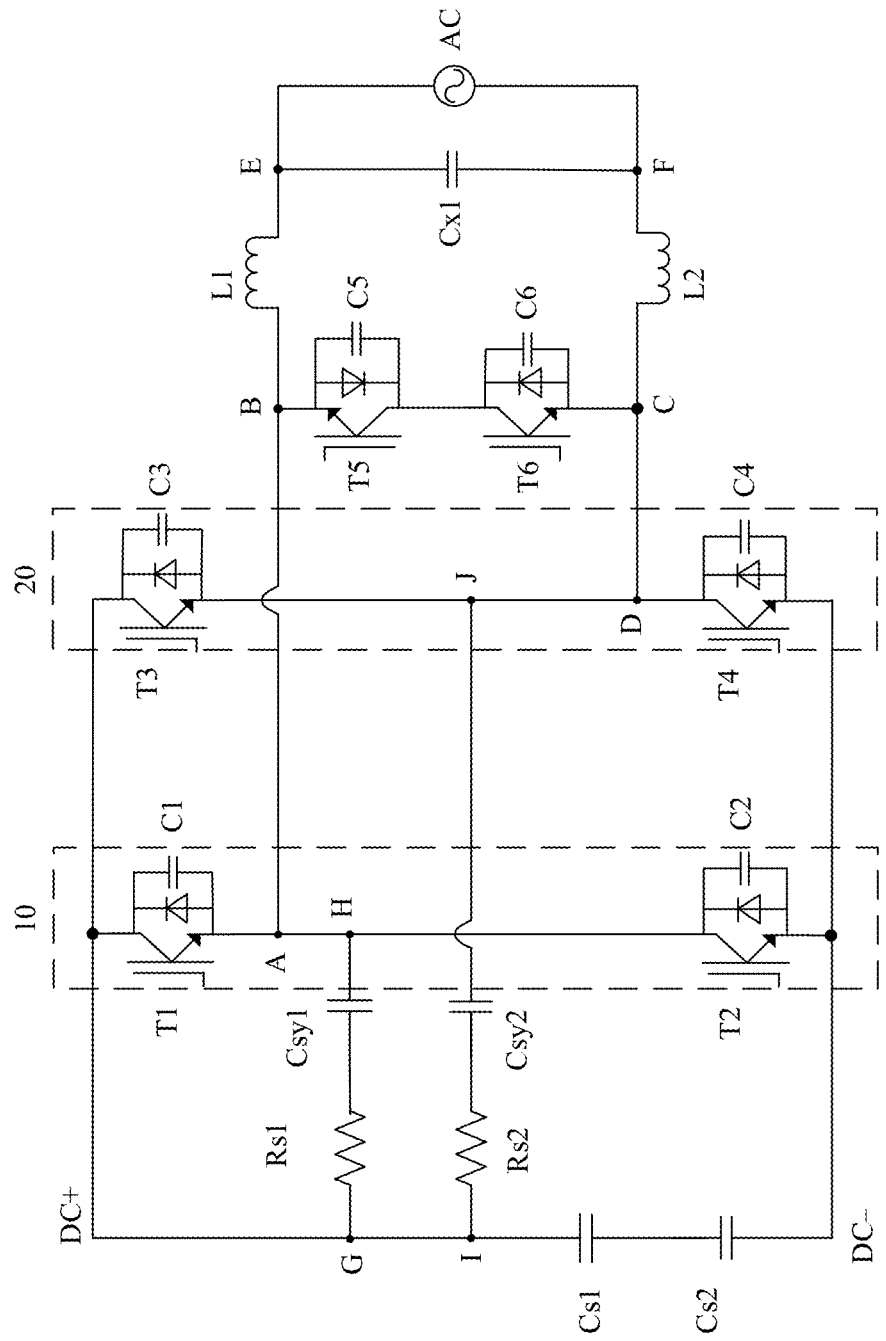
FIG. 9 is a circuit diagram of another implementation of an inverter circuit according to an embodiment of this application.

Further, as shown in FIG. 9, based on the second implementation of this embodiment of this application, the resistor Rs1 and the resistor Rs2 are respectively disposed in series on the third capacitor Csy1 and the fourth capacitor Csy2. The resistor Rs1 is connected in series to the third capacitor Csy1, and the resistor Rs2 is connected in series to the fourth capacitor Csy2.

In this embodiment, in a process in which the third capacitor Csy1 and the fourth capacitor Csy2 are charged, if a charged current is excessively large, the resistor Rs1 and the resistor Rs2 respectively connected in series to the third capacitor Csy1 and the fourth capacitor Csy2 can convert extra electric energy. This protects the third capacitor Csy1 and the fourth capacitor Csy2, and prevents the third capacitor Csy1 and the fourth capacitor Csy2 from being damaged due to charging by a large current.

Figure 10:
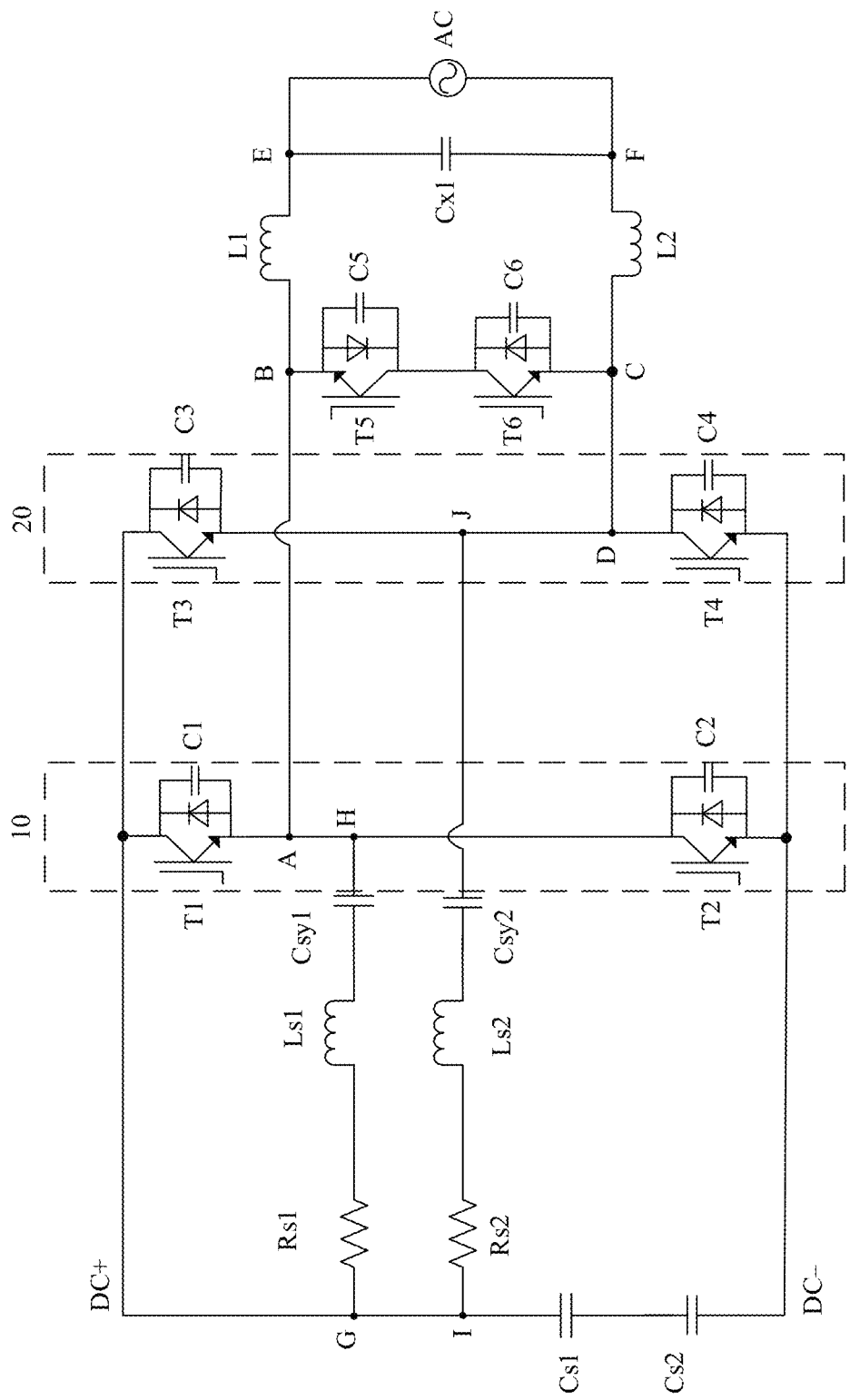
FIG. 10 is a circuit diagram of another implementation of an inverter circuit according to an embodiment of this application.

Further, as shown in FIG. 10, based on the second implementation of this embodiment of this application, the inductor Ls1, the inductor Ls2, the resistor Rs1, and the resistor Rs2 are disposed in series with the third capacitor Csy1 and the fourth capacitor Csy2. The inductor Ls1 and the resistor Rs1 are connected in series to the third capacitor Csy1, and the inductor Ls2 and the resistor Rs2 are connected in series to the fourth capacitor Csy2.

In this embodiment, in a process in which the third capacitor Csy1 and the fourth capacitor Csy2 are charged, the inductor Ls1 and the inductor Ls2 can share a current charged into the third capacitor Csy1 and the fourth capacitor Csy2, to prevent the third capacitor Csy1 and the fourth capacitor Csy2 from being damaged due to instantaneous charging of an excessive current. Further, the resistor Rs1 and the resistor Rs2 that are connected in series can convert extra electric energy. This further protects the third capacitor Csy1 and the fourth capacitor Csy2, and prevents the third capacitor Csy1 and the fourth capacitor Csy2 from being damaged due to charging by a large current.

Figure 11:
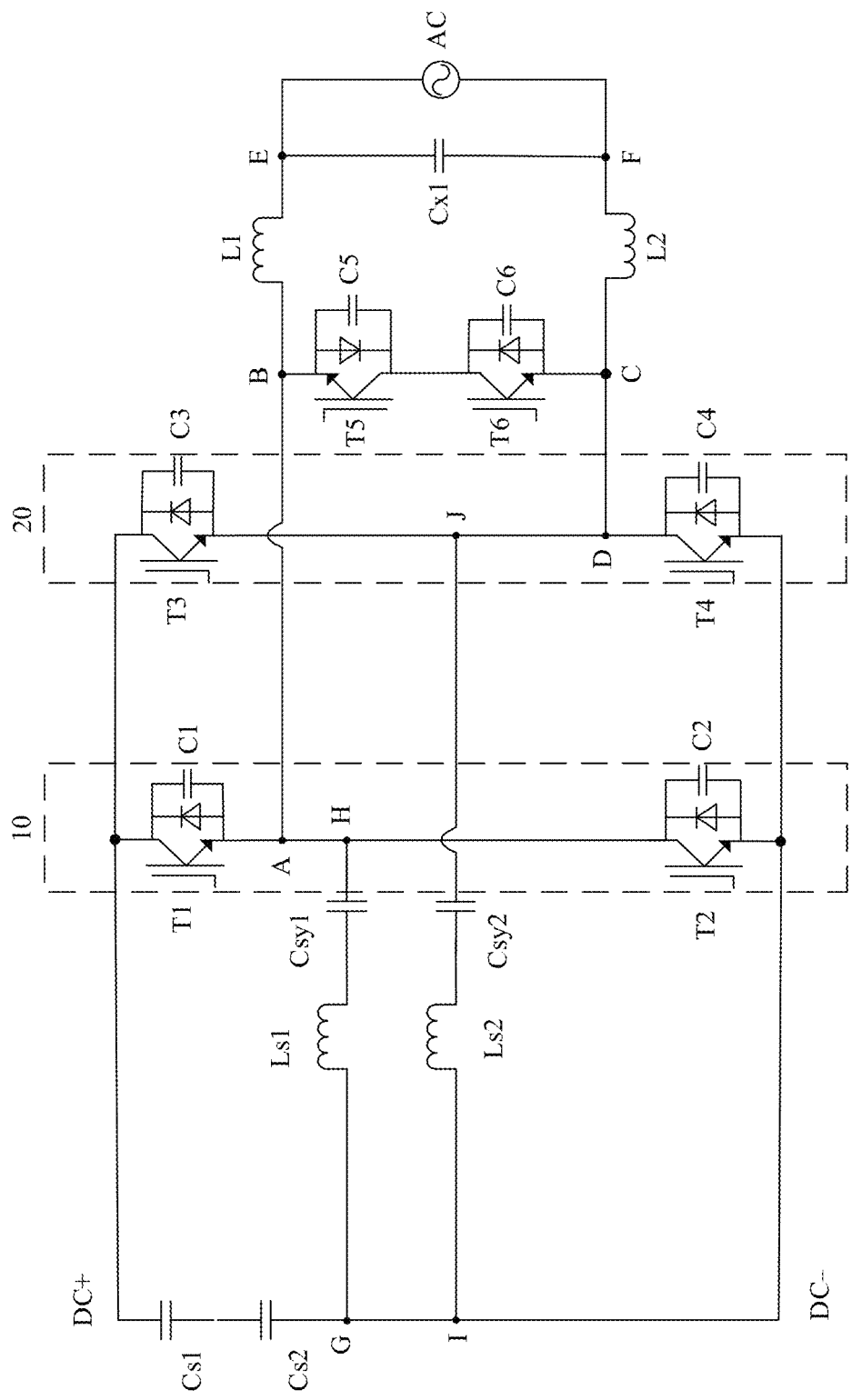
FIG. 11 is a circuit diagram of another implementation of an inverter circuit according to an embodiment of this application.

As shown in FIG. 11, based on the third implementation of this embodiment of this application, the inductor Ls1 and the inductor Ls2 are respectively disposed in series on the third capacitor Csy1 and the fourth capacitor Csy2. The inductor Ls1 is connected in series to the third capacitor Csy1, and the inductor Ls2 is connected in series to the fourth capacitor Csy2.

In this embodiment, in a process in which the third capacitor Csy1 and the fourth capacitor Csy2 are charged, the inductor Ls1 and the inductor Ls2 can share a current charged into the third capacitor Csy1 and the fourth capacitor Csy2, to prevent the third capacitor Csy1 and the fourth capacitor Csy2 from being damaged due to instantaneous charging by an excessive current. When the charging of the third capacitor Csy1 and the fourth capacitor Csy2 is completed, the inductor Ls1 and the inductor Ls2 may release the charged current, and slowly charge the third capacitor Csy1 and the fourth capacitor Csy2, so that a large current does not damage the third capacitor Csy1 and the fourth capacitor Csy2, and does not waste an excess current.

Figure 12:
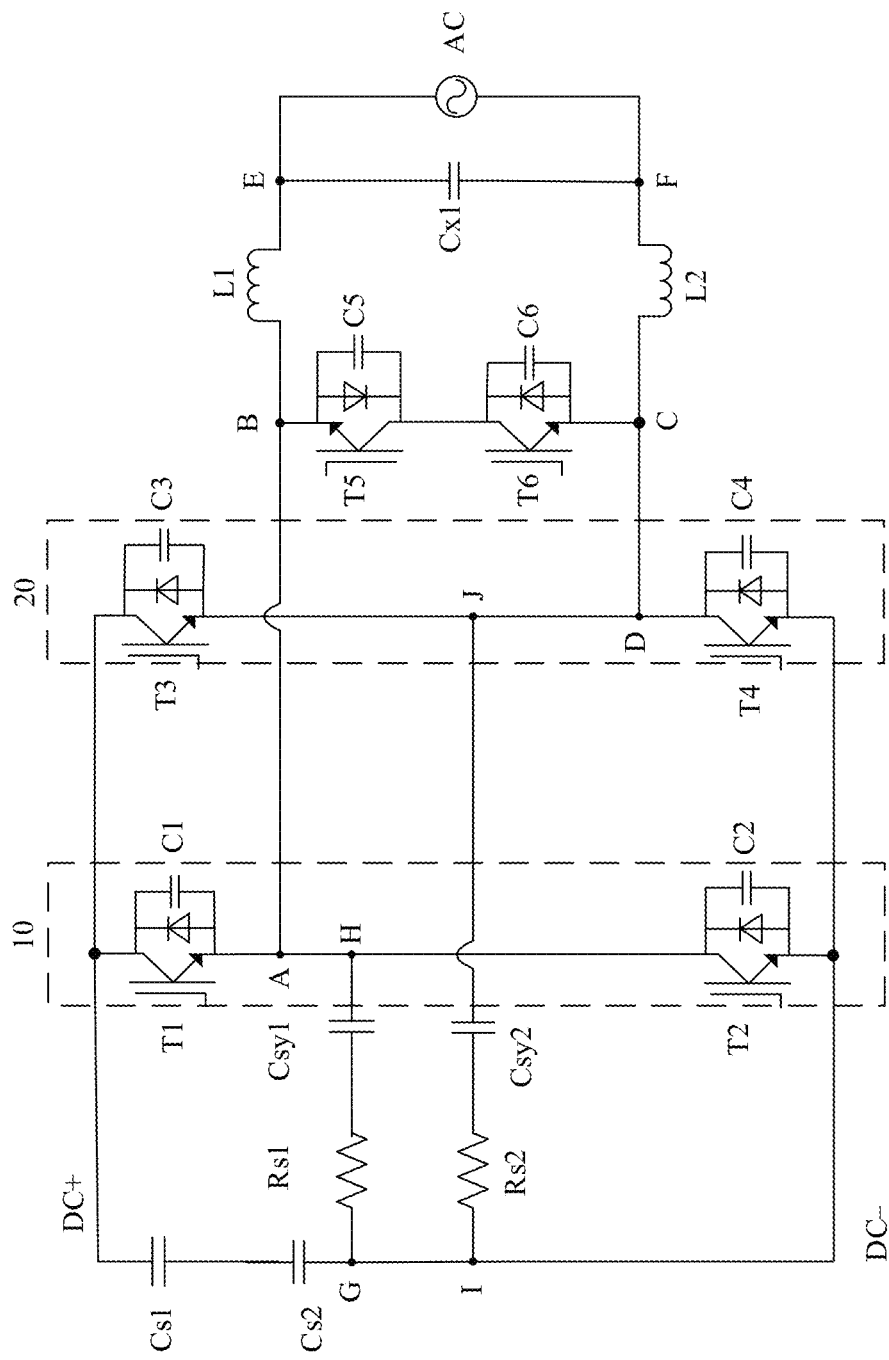
FIG. 12 is a circuit diagram of another implementation of an inverter circuit according to an embodiment of this application.

Further, as shown in FIG. 12, based on the third implementation of this embodiment of this application, the resistor Rs1 and the resistor Rs2 are respectively disposed in series on the third capacitor Csy1 and the fourth capacitor Csy2. The resistor Rs1 is connected in series to the third capacitor Csy1, and the resistor Rs2 is connected in series to the fourth capacitor Csy2.

In this embodiment, in a process in which the third capacitor Csy1 and the fourth capacitor Csy2 are charged, if a charged current is excessively large, the resistor Rs1 and the resistor Rs2 respectively connected in series to the third capacitor Csy1 and the fourth capacitor Csy2 can convert extra electric energy. This protects the third capacitor Csy1 and the fourth capacitor Csy2, and prevents the third capacitor Csy1 and the fourth capacitor Csy2 from being damaged due to charging by a large current.

Figure 13:
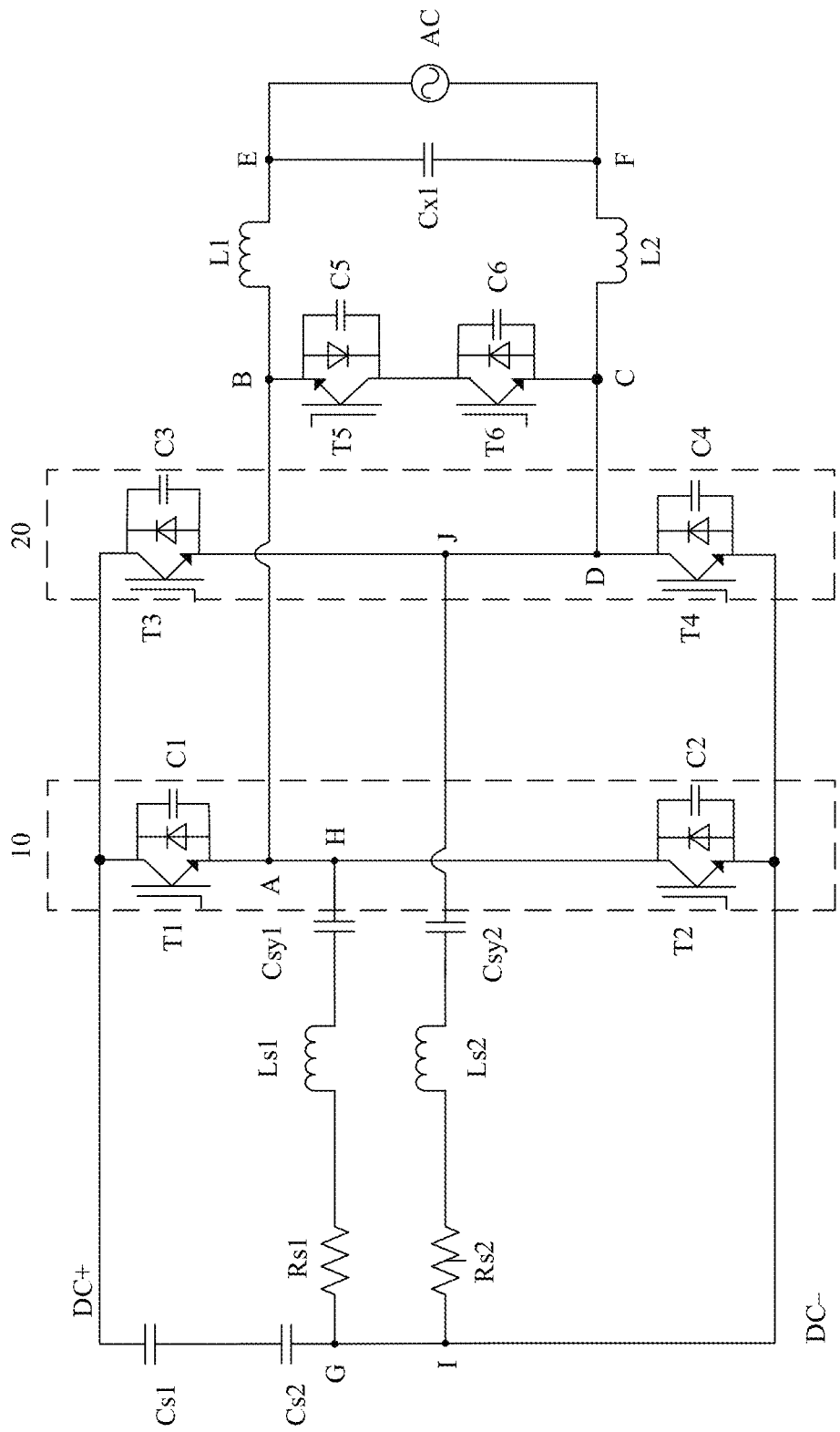
FIG. 13 is a circuit diagram of another implementation of an inverter circuit according to an embodiment of this application.

Further, as shown in FIG. 13, based on the third implementation of this embodiment of this application, the inductor Ls1, the inductor Ls2, the resistor Rs1, and the resistor Rs2 are disposed in series with the third capacitor Csy1 and the fourth capacitor Csy2. The inductor Ls1 and the resistor Rs1 are connected in series to the third capacitor Csy1, and the inductor Ls2 and the resistor Rs2 are connected in series to the fourth capacitor Csy2.

In this embodiment, in a process in which the third capacitor Csy1 and the fourth capacitor Csy2 are charged, the inductor Ls1 and the inductor Ls2 can share a current charged into the third capacitor Csy1 and the fourth capacitor Csy2, to prevent the third capacitor Csy1 and the fourth capacitor Csy2 from being damaged due to instantaneous charging by an excessive current. Further, the resistor Rs1 and the resistor Rs2 that are connected in series can convert extra electric energy. This further protects the third capacitor Csy1 and the fourth capacitor Csy2, and prevents the third capacitor Csy1 and the fourth capacitor Csy2 from being damaged due to charging by a large current.

Further, based on the foregoing fourth to ninth implementations, an impedance network may be disposed on the third capacitor Csy1 and the fourth capacitor Csy2. For a specific setting manner, refer to the foregoing first to third implementations. A difference lies only in different combinations of the bridge-connection modes. Details are not described herein again.

It should be noted that, when the impedance network is disposed, the impedance network may protect the third capacitor Csy1 and the fourth capacitor Csy2, and prevent the third capacitor Csy1 and the fourth capacitor Csy2 from being damaged in a charging process. However, existence of the impedance network also reduces the third capacitor Csy1 and the fourth capacitor Csy2, thereby affecting protection of the third capacitor Csy1 and the fourth capacitor Csy2 against resonance in a turn-off process of the switching transistors to some extent. In this way, users can determine, depending on actual situations, whether to add an impedance network and to increase a quantity of capacitors specifically disposed in the impedance network and a quantity of inductors specifically disposed in the impedance network.

Figure 14:
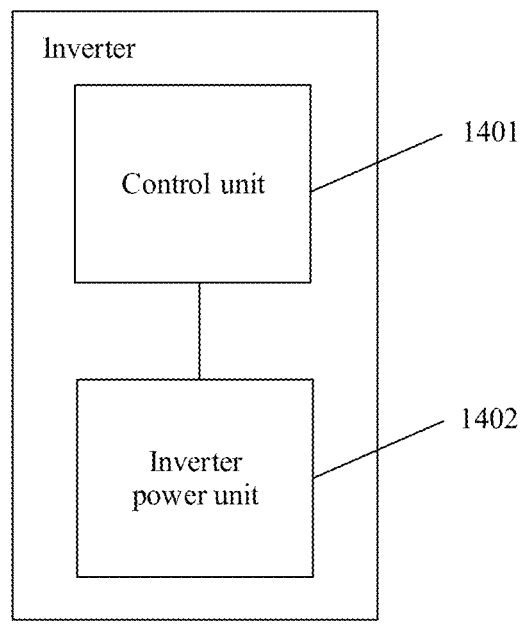
FIG. 14 is a schematic structural diagram of an inverter according to an embodiment of this application.

As shown in FIG. 14, an embodiment of this application further provides an inverter. The inverter includes a control unit 1401 and an inverter power unit 1402. The control unit is configured to control the inverter power unit, and the inverter power unit 1402 includes the inverter circuit according to any one of the foregoing implementations. For understanding, refer to the foregoing description of the inverter circuit. The control unit 1401 may include a control chip and a circuit structure configured to implement a function of the control chip. Operation of the control unit 1401 and the inverter power unit 1402 may include that the control unit 1401 controls turn-on or turn-off of each switching transistor of the inverter circuit in the inverter power unit 1402.

Figure 15:
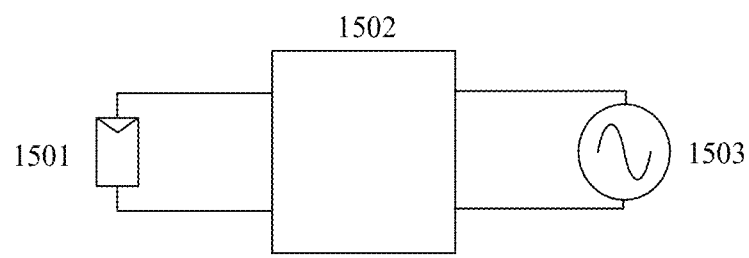
FIG. 15 is a schematic structural diagram of a photovoltaic power system according to an embodiment of this application.

As shown in FIG. 15, an embodiment of this application further provides a photovoltaic power system, including a photovoltaic panel 1501, an inverter 1502, and an alternating current power grid 1503. The photovoltaic panel 1501 is connected to the inverter 1502, and the inverter 1502 is connected to the alternating current power grid 1503. The photovoltaic panel 1501 is configured to convert light energy into a direct current. The inverter 1502 includes the inverter circuit according to any one of the foregoing embodiments, and is configured to convert the direct current into an alternating current. The alternating current power grid 1503 is configured to transmit the alternating current.

In this embodiment, the inverter converts the direct current generated by the photovoltaic panel through solar energy power generation into alternating current, and connects the alternating current to the alternating current power grid, so that solar energy is utilized. The inverter circuit included in the inverter is the inverter circuit according to any one of the foregoing embodiments. For understanding, refer to the foregoing description of the inverter circuit. The inverter circuit not only can convert the direct current into the alternating current, but also can avoid an EMC problem caused by a resonance phenomenon.

The foregoing describes in detail the inverter circuit, the inverter, and the photovoltaic power system that are provided in the embodiments of this application. The principles and implementations of this application are described herein by using specific examples. The description about the embodiments of this application is merely provided to help understand the method and core ideas of this application. In addition, a person of ordinary skill in the art can make variations and modifications to this application in terms of the specific implementations and application scopes according to the ideas of this application. Therefore, the content of specification shall not be construed as a limitation to this application.

What is claimed is:

1. An inverter circuit, comprising:
a bus, a first longitudinal bridge, a second longitudinal bridge, a transverse bridge, and a filter, wherein a capacitor group is disposed on the bus, the bus is connected in parallel to a direct current power supply, and the capacitor group comprises a first capacitor and a second capacitor that are disposed in series;
the bus is connected in parallel to the first longitudinal bridge, the first longitudinal bridge is connected in parallel to the second longitudinal bridge, the first longitudinal bridge comprises a first switching transistor and a second switching transistor that are connected in series, the second longitudinal bridge comprises a third switching transistor and a fourth switching transistor that are connected in series, and two ends of the transverse bridge are respectively connected to the first longitudinal bridge and the second longitudinal bridge;
the filter is connected in parallel to the transverse bridge, the filter is configured to be connected to an alternating current power grid, and the transverse bridge is configured to supply power to the alternating current power grid by using the filter; and
the inverter circuit further comprises
a third capacitor having a first end connected to a source of the first switching transistor and having a second end connected to a drain of the first switching transistor through the first capacitor and a fourth capacitor having a first end connected to a drain of the fourth switching transistor and having a second end connected to a source of the fourth switching transistor through the second capacitor.

2. The inverter circuit according to claim 1, wherein at least one inductor is disposed in series on a line on which the third capacitor is located, and/or at least one inductor is disposed in series on a line on which the fourth capacitor is located.

3. The inverter circuit according to claim 1, wherein at least one resistor is disposed in series on a line on which the third capacitor is located, and/or at least one resistor is disposed in series on a line on which the fourth capacitor is located.

4. The inverter circuit according to claim 1, wherein at least one inductor and at least one resistor are disposed in series on a line on which the third capacitor is located, and/or at least one inductor and at least one resistor are disposed in series on a line on which the fourth capacitor is located.

5. The inverter circuit according to claim 1, wherein both a connection point between a line on which the third capacitor is located and the bus and a connection point between a line on which the fourth capacitor is located and the bus are disposed between the first capacitor and the second capacitor.

6. The inverter circuit according to claim 1, wherein neither a connection point between a line on which the third capacitor is located and the bus nor a connection point between a line on which the fourth capacitor is located and the bus is disposed between the first capacitor and the second capacitor.

7. The inverter circuit according to claim 1, wherein only one of a connection point between a line on which the third capacitor is located and the bus or a connection point between a line on which the fourth capacitor is located and the bus is disposed between the first capacitor and the second capacitor.

8. The inverter circuit according to claim 1, wherein the filter comprises a first inductor and a second inductor, and the transverse bridge comprises a freewheeling switch group, wherein
the first inductor is connected between the first longitudinal bridge and the alternating current power grid, the second inductor is connected between the alternating current power grid and the second longitudinal bridge, and the freewheeling switch group is connected in parallel between the first inductor and the second inductor.

9. The inverter circuit according to claim 8, wherein the freewheeling switch group comprises a fifth switching transistor and a sixth switching transistor connected in series.

10. An inverter, comprising:
a control unit and an inverter circuit, wherein the control unit is configured to control the inverter circuit, and the inverter circuit comprising a bus, a first longitudinal bridge, a second longitudinal bridge, a transverse bridge, and a filter, wherein a capacitor group is disposed on the bus, the bus is connected in parallel to a direct current power supply, and the capacitor group comprises a first capacitor and a second capacitor that are disposed in series;
the bus is connected in parallel to the first longitudinal bridge, the first longitudinal bridge is connected in parallel to the second longitudinal bridge, the first longitudinal bridge comprises a first switching transistor and a second switching transistor that are connected in series, the second longitudinal bridge comprises a third switching transistor and a fourth switching transistor that are connected in series, and two ends of the transverse bridge are respectively connected to the first longitudinal bridge and the second longitudinal bridge;
the filter is connected in parallel to the transverse bridge, the filter is configured to be connected to an alternating current power grid, and the transverse bridge is configured to supply power to the alternating current power grid by using the filter; and
the inverter circuit further comprises
a third capacitor having a first end connected to a source of the first switching transistor and having a second end connected to a drain of the first switching transistor through the first capacitor and
a fourth capacitor having a first end connected to a drain of the fourth switching transistor and having a second end connected a source of the fourth switching transistor through the second capacitor.

11. The inverter according to claim 10, wherein at least one inductor is disposed in series on a line on which the third capacitor is located, and/or at least one inductor is disposed in series on a line on which the fourth capacitor is located.

12. The inverter according to claim 10, wherein at least one resistor is disposed in series on a line on which the third capacitor is located, and/or at least one resistor is disposed in series on a line on which the fourth capacitor is located.

13. The inverter according to claim 10, wherein at least one inductor and at least one resistor are disposed in series on a line on which the third capacitor is located, and/or at least one inductor and at least one resistor are disposed in series on a line on which the fourth capacitor is located.

14. The inverter according to claim 10, wherein both a connection point between a line on which the third capacitor is located and the bus and a connection point between a line on which the fourth capacitor is located and the bus are disposed between the first capacitor and the second capacitor.

15. A photovoltaic power system, comprising:
a photovoltaic panel and an inverter, wherein the photovoltaic panel is connected to the inverter, and the inverter is configured to be connected to the alternating current power grid;
the photovoltaic panel is configured to convert light energy into a direct current;
the inverter comprises an inverter circuit, and the inverter is configured to convert the direct current into an alternating current; and
wherein the inverter circuit comprising a bus, a first longitudinal bridge, a second longitudinal bridge, a transverse bridge, and a filter, a capacitor group is disposed on the bus, the bus is connected in parallel to the photovoltaic panel, and the capacitor group comprises a first capacitor and a second capacitor that are disposed in series;
the bus is connected in parallel to the first longitudinal bridge, the first longitudinal bridge is connected in parallel to the second longitudinal bridge, the first longitudinal bridge comprises a first switching transistor and a second switching transistor that are connected in series, the second longitudinal bridge comprises a third switching transistor and a fourth switching transistor that are connected in series, and two ends of the transverse bridge are respectively connected to the first longitudinal bridge and the second longitudinal bridge; and
the filter is connected in parallel to the transverse bridge, the filter is connected to an alternating current power grid, and the transverse bridge is configured to supply power to the alternating current power grid by using the filter; and the inverter circuit further comprises a third capacitor having a first end connected to a source of the first switching transistor and having a second end connected to a drain of the first switching transistor through the first capacitor and a fourth capacitor having a first end connected to a drain of the fourth switching transistor and having a second end connected to a source of the fourth switching transistor through the second capacitor.

16. The photovoltaic power system according to claim 15, wherein at least one inductor is disposed in series on a line on which the third capacitor is located, and/or at least one inductor is disposed in series on a line on which the fourth capacitor is located.

17. The photovoltaic power system according to claim 15, wherein at least one resistor is disposed in series on a line on which the third capacitor is located, and/or at least one resistor is disposed in series on the a on which the fourth capacitor is located.

18. The photovoltaic power system according to claim 15, wherein at least one inductor and at least one resistor are disposed in series on the a on which the third capacitor is located, and/or at least one inductor and at least one resistor are disposed in series on the a on which the fourth capacitor is located.

19. The photovoltaic power system according to claim 15, wherein both a connection point between a line on which the third capacitor is located and the bus and a connection point between the a on which the fourth capacitor is located and the bus are disposed between the first capacitor and the second capacitor.

* * * * *

UNITED STATES PATENT AND TRADEMARK OFFICE
CERTIFICATE OF CORRECTION

PATENT NO. : 12,034,380 B2
APPLICATION NO. : 17/536624
DATED : July 9, 2024
INVENTOR(S) : Dechen Wang et al.

It is certified that error appears in the above-identified patent and that said Letters Patent is hereby corrected as shown below:

In the Claims

In Column 22, Line 67, in Claim 1, delete "capacitor" and insert -- capacitor, --.

In Column 24, Line 14, in Claim 10, delete "capacitor" and insert -- capacitor, --.

In Column 24, Line 17, in Claim 10, delete "a source" and insert -- to a source --.

In Column 25, Line 8, in Claim 15, delete "capacitor" and insert -- capacitor, --.

In Column 26, Line 4, in Claim 17, delete "the a" and insert -- a line --.

In Column 26, Line 8, in Claim 18, delete "the a" and insert -- a line --.

In Column 26, Line 10, in Claim 18, delete "the a" and insert -- a line --.

In Column 26, Line 15, in Claim 19, delete "the a" and insert -- a line --.

Signed and Sealed this
Seventeenth Day of September, 2024

Katherine Kelly Vidal
*Director of the United States Patent and Trademark Office*